United States Patent
Morita

(10) Patent No.: US 8,567,683 B2
(45) Date of Patent: Oct. 29, 2013

(54) READER DEVICE AND OUTING DATA CARRIER DECISION METHOD

(75) Inventor: Kugo Morita, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 1090 days.

(21) Appl. No.: 11/816,267

(22) PCT Filed: Feb. 24, 2006

(86) PCT No.: PCT/JP2006/303478
§ 371 (c)(1),
(2), (4) Date: Aug. 14, 2007

(87) PCT Pub. No.: WO2006/090854
PCT Pub. Date: Aug. 31, 2006

(65) Prior Publication Data
US 2009/0206151 A1    Aug. 20, 2009

(30) Foreign Application Priority Data

Feb. 24, 2005   (JP) .................................. 2005-049723
Oct. 28, 2005   (JP) .................................. 2005-314918

(51) Int. Cl.
G06F 17/00    (2006.01)
G06K 19/06   (2006.01)

(52) U.S. Cl.
USPC ......................................... 235/492; 235/375

(58) Field of Classification Search
USPC ............ 235/451, 383, 375, 385, 472.01, 492;
340/10.2, 572.1, 10.42
See application file for complete search history.

(56) References Cited

U.S. PATENT DOCUMENTS

| 5,337,243 A | 8/1994 | Shibata et al. |
| 6,104,340 A * | 8/2000 | Krasner .................... 342/357.64 |
| 6,150,980 A * | 11/2000 | Krasner .................... 342/357.29 |
| 6,178,195 B1 * | 1/2001 | Durboraw et al. ............ 375/136 |
| 6,325,284 B1 * | 12/2001 | Walker et al. ................. 235/380 |
| 6,366,205 B1 * | 4/2002 | Sutphen ...................... 340/568.6 |
| 6,547,137 B1 * | 4/2003 | Begelfer et al. ............... 235/385 |

(Continued)

FOREIGN PATENT DOCUMENTS

JP        04178587 A    6/1992
JP        09-115096       5/1997

(Continued)

OTHER PUBLICATIONS

Japanese language office action dated May 24, 2011 and its English language translation for corresponding Japanese application 2005314913.

(Continued)

Primary Examiner — Thien T Mai
(74) Attorney, Agent, or Firm — DLA Piper LLP (US)

(57) ABSTRACT

In order to decide an attribute of each data carrier without manual operation, an RFID reader (30) which is carried by a user includes an identification information acquisition unit (310) reading identification information for identifying an RFID from the RFID in the vicinity in a non-contact state, a reader position acquisition unit (315) obtaining reader position information indicating a position of the RFID reader (30) when the identification information is read, an RFID position decision unit (316) deciding representative position information indicating the position of the RFID based on the obtained reader position information, and a storage unit (32) correlating the decided representative position information with the read identification information and storing them.

2 Claims, 14 Drawing Sheets

(56) References Cited

U.S. PATENT DOCUMENTS

| | | | |
|---|---|---|---|
| 6,941,222 B2 | 9/2005 | Yano et al. | |
| 6,975,205 B1* | 12/2005 | French et al. | 235/383 |
| 7,267,275 B2* | 9/2007 | Cox et al. | 235/451 |
| 7,959,517 B2* | 6/2011 | Lastowka | 473/198 |
| 8,226,495 B2* | 7/2012 | Savarese et al. | 473/222 |
| 2002/0158751 A1* | 10/2002 | Bormaster | 340/10.2 |
| 2002/0161517 A1 | 10/2002 | Yano et al. | |
| 2003/0095032 A1 | 5/2003 | Hoshino et al. | 340/5.92 |
| 2004/0140362 A1* | 7/2004 | Allen | 235/487 |
| 2004/0212480 A1* | 10/2004 | Carrender et al. | 340/10.42 |
| 2005/0061877 A1* | 3/2005 | Stevens | 235/385 |
| 2006/0022823 A1* | 2/2006 | Ryal | 340/572.1 |

FOREIGN PATENT DOCUMENTS

| | | |
|---|---|---|
| JP | 2001-328713 | 11/2001 |
| JP | 2002328035 A | 11/2002 |
| JP | 2002334361 A | 11/2002 |
| JP | 2003-095441 | 4/2003 |
| JP | 2003-157477 | 5/2003 |
| JP | 2003-267555 | 9/2003 |
| JP | 2003296875 A | 10/2003 |
| JP | 2004005251 A | 1/2004 |
| JP | 2004045413 A | 2/2004 |
| JP | 2004-206590 | 7/2004 |
| JP | 2004191309 A | 7/2004 |
| JP | 2004362439 A | 12/2004 |
| JP | 2005009891 A | 1/2005 |

OTHER PUBLICATIONS

Japanese language office action and its English language translation for corresponding Japanese application 2005049723, Dec. 22, 2009.

* cited by examiner

| IDENTIFICATION INFORMATION | DISTINCTION FIXED/ MOVING | REGISTERED POSITION INFORMATION | NUMBER OF POSITION INFORMATION | POSITION INFORMATION GROUP |
|---|---|---|---|---|
| | | POSITION MOVEMENT POSSIBILITY FLAG | NUMBER OF PROVISIONAL POSITION INFORMATION | PROVISIONAL POSITION INFORMATION GROUP |

FIG. 14

| RFID IDENTIFICATION INFORMATION | CATEGORY | OUTING JUDGMENT THRESHOLD VALUE |
|---|---|---|
| ID-A | HOME | 5min |
| ID-B | WEARABLE | – |
| ID-C | HOME | 4min |
| ID-D | PORTABLE | – |
| ⋮ | ⋮ | ⋮ |

FIG. 15

| RFID IDENTIFICATION INFORMATION | RECOGNITION TIME |
|---|---|
| ID-E | 8 : 30 : 25 |
| ID-F | 8 : 35 : 50 |
| ⋮ | ⋮ |

FIG. 16

| HOME ID | RFID IDENTIFICATION INFORMATION | DIFFERENTIAL TIME |
|---|---|---|
| ID-A | ID-F | 3min 13sec |
| ⋮ | ⋮ | ⋮ |

READER DEVICE AND OUTING DATA CARRIER DECISION METHOD

TECHNICAL FIELD

The present invention relates to a reader device and an outing data carrier decision method.

BACKGROUND ART

A data carrier system is known in which a data carrier (e.g. a radio frequency identification (RFID)) capable of storing a certain amount of data is mounted to an object, and a reader device reads identification information stored in the data carrier, thereby making it possible to provide various services such as identification of the object.

The services provided by the data carrier system include a navigation service using a position in which a data carrier is installed (see, for example, Patent Document 1).

Conventionally, in the case of providing this type of service by using a position in which a data carrier is installed, position information indicating the position of the data carrier is stored in the data carrier itself, a server, or the like, and various services are provided based on the position information thus stored. In the following, a description is given of an example of this navigation service.

First, data carriers each storing location information (including the above-mentioned position information) indicating a location at which a data carrier is attached are attached to various places in town (e.g., bus stops and stores). When a user walks around the town while carrying a reader device (e.g., a cellular phone equipped with a data carrier reading function), the reader device acquires the location information from the data carrier located within a radio wave-reachable range.

The reader device that has acquired the location information acquires provided information (e.g., bus approach information and information on products on sale) corresponding to a location indicated by the acquired location information. Specifically, information is acquired by acquiring information stored in the reader device in advance or by connecting to the network each time. Thus the reader device acquires the provided information corresponding to the location at which the data carrier is attached, to thereby provide the acquired provided information to the user.

[Patent Document 1] JP 2004-206590 A (paragraph 0004)

DISCLOSURE OF THE INVENTION

Problems to be Solved by the Invention

According to the above-mentioned conventional technology, however, there has been a problem in that the position information is manually stored in the data carrier itself, a server, or the like, which involves an immense amount of extra effort. For this reason, there has been a demand for a technology capable of obtaining the position information of the data carrier without manual operation.

Also, the aforementioned provided information is mainly needed by a user on an outing. According to the above-mentioned conventional technology, however, the reader device is unable to recognize that the user is about to go out, and therefore the reader device does not obtain the provided information until the user actually goes out to arrive at a location where the user needs the provided information. This may lead to a case where the provided information has not been acquired by the time when the user wants to be provided with the provided information.

In view of the above-mentioned problem, it is conceivable to adopt another method involving installing the data carrier at a home space (such as a house or a workplace) of a user and enabling the reader device to recognize that the user has gone out at a point in time when the data carrier ceases to be recognized any more. Even with this method, there has been a problem that the reader device cannot recognize that the outing of the user until the user has actually gone out. Accordingly, there has been a demand for a technology capable of deciding a data carrier (outing data carrier) installed in an object (a shoe and the like) to be worn by the user when going out without manual operation. This technology allows the reader device to judge that the user is about to go out of a predetermined area such as a home space by the fact that the outing data carrier has been recognized.

As described above, it has been demanded that the attributes correlated with individual data carriers (such as the position of each data carrier or the fact that the data carrier is an outing data carrier) be decided without manual operation.

Therefore, it is an object of the present invention to provide a reader device capable of deciding the attributes correlated with individual data carriers without manual operation and an outing data carrier decision method therefor. Also, it is another object of the present invention to provide a reader device capable of obtaining the position of a data carrier without the need for manually storing the position information of the data carrier. Further, it is still another object of the present invention to provide a reader device capable of recognizing that a user is about to go out of a predetermined area such as a home space and an outing data carrier decision method therefor.

Means for Solving the Problems

A reader device according to the present invention for resolving the above-mentioned problems which is carried by a user and contains an identification information reader unit reading identification information for identifying a data carrier from the data carrier in a non-contact state, includes a reader device position information acquisition unit obtaining reader device position information indicating a position of the reader device, when the identification information is read by the identification information reader unit; a position information decision unit deciding data carrier position information indicating a position of the data carrier based on the reader device position information obtained by the reader device position information acquisition unit; and a correlating unit correlating the data carrier position information decided by the position information decision unit with the identification information read by the identification information reader unit, and executing a process of registering the data carrier position information as registered position information indicating a registered position of the identification information.

According to the present invention, the reader device position information indicating the position of the reader device at a time of reading the identification information from the data carrier can be correlated with the identification information read out from the data carrier as a registered position of the data carrier. Therefore, there is no need to manually store the position information of the data carrier, which makes it possible to decide the attributes correlated with individual data carriers without manual operation.

Further, in the above-mentioned reader device, the position information decision unit may include a storage unit storing a plurality of reader device position information obtained by the reader device position information acquisition unit, and decide the data carrier position information indicating the registered position of the data carrier based on the plurality of reader device position information stored in the storage unit.

In the manner as described above, it is possible to decide with more accuracy the reading target data carrier position information indicating the registered position in which the data carrier is installed, based on the plurality of reader device position information.

Further, the above-mentioned reader device may further include a data carrier position information storage unit storing the data carrier position information decided by the position information decision unit in correlation with the identification information identifying the data carrier; and a movement judging unit judging, in a case where the reader device position information is obtained by the reader device position information acquisition unit, whether the data carrier has moved or not from the registered position based on a distance between a position indicated by the obtained reader device position information and the registered position indicated by the data carrier position information stored in the data carrier position information storage unit.

In the manner as described above, it is possible to judge whether the data carrier has moved or not.

Further, the above-mentioned reader device may further include a mobility judging unit judging, in a case where a plurality of reader device position information are obtained by the reader device position information acquisition unit, whether the data carrier is the one attached to a moving object or not based on a degree of dispersion of positions indicated by each of the obtained reader device position information.

In the manner as described above, the reader device can judge whether the data carrier is the one attached to a moving object or not.

Note that the aforementioned degree of dispersion can be obtained by calculating the dispersion of numeric values (such as distances from a predetermined position to the respective reader devices or coordinate values of the respective reader devices) generated based on the aforementioned reader device position information.

Further, a reader device according to another aspect of the present invention for recognizing a data carrier capable of transmitting and receiving radio waves to and from the reader device from among a plurality of data carriers respectively installed in a plurality of objects, includes a specifying unit specifying a data carrier installed in a predetermined area from among the plurality of data carriers; a outing data carrier identification information provisional storage unit storing, when another data carrier is recognized in a case where the data carrier specified by the specifying unit is being recognized, data carrier identification information indicating the another data carrier together with a time at which the another data carrier is recognized; and a outing data carrier identification information decision unit deciding, in a case where the data carrier specified by the specifying unit is no longer recognized, outing data carrier identification information which can still be recognized even when the user has gone out of the predetermined area from among the data carrier identification information stored by the outing data carrier identification information provisional storage unit based on the time stored by the outing data carrier identification information provisional storage unit.

People wear certain things only when going out of a predetermined area while not wearing those things when inside the predetermined area. For example, Japanese people do not wear shoes inside the house, but wear shoes when outside in most cases. People wear those things immediately before going out. According to the aforementioned reader device, it is possible to discriminate a data carrier attached to an object, such as the shoe described above, that is worn by a person immediately before going out by discriminating a data carrier that is worn by a person immediately before going out. In other words, it is possible to decide whether each of the data carriers is an outing data carrier or not without manual operation. Thereafter the reader device can recognize that the user is about to go out of a predetermined area such as a home space through the intermediation of the data carrier.

Further, in the above-mentioned reader device, the reader device may further include a time acquisition unit obtaining a time at which the data carrier specified by the specifying unit ceases to be recognized, and the outing data carrier identification information decision unit may the information in which a difference between the time obtained by the time acquisition unit and the time stored by the outing data carrier information provisional storage unit is equal to or less than a predetermined value as the outing data carrier identification information which can still be recognized even when the user has gone out of the predetermined area, from among the outing data carrier identification information stored by the outing data carrier identification information provisional storage unit.

In the manner as described above, the reader device compares the time when a user wore the data carrier with the time when the user actually went out, to thereby judge that the data carrier is the one that was worn immediately before the user goes out when the difference between those times is equal to or less than a predetermined value.

Further, in this reader device, the reader device may further include storage unit storing the predetermined value for each data carrier specified by the specifying unit, and the outing data carrier identification information decision unit may decide the outing data carrier identification information in which a difference between the time obtained by the time acquisition unit and the time stored by the outing data carrier identification information provisional storage unit is equal to or less than a predetermined value stored in relation to a data carrier which has actually been recognized of the data carriers specified by the specifying unit as the outing data carrier identification information which can still be recognized even when the user has gone out of the predetermined area, from among the outing data carrier identification information stored by the outing data carrier identification information provisional storage unit.

In the manner as described above, the reader device can change the predetermined value (the degree of how "immediately before" with regard to the aforementioned "immediately before the outing") for each home space, to thereby decide an appropriate outing data carrier identification information in view of individual situation of each home space.

Further, an outing data carrier decision method according to the present invention for deciding a data carrier which is still recognized when a user has gone out of a predetermined area in which a reader device for recognizing a data carrier capable of transmitting and receiving radio waves to and from the reader device from among a plurality of data carriers respectively installed in a plurality of objects is used, includes a specifying step of specifying a data carrier installed in the predetermined area from among the plurality of data carriers; an outing data carrier identification information provisional storing step of storing, when another data carrier is recognized in a case where the data carrier specified in the specifying step is being recognized, data carrier identification information indicating the another data carrier together with a time at which the another data carrier is recognized; and an outing data carrier identification information decision step of deciding, in a case where the data carrier specified in the specifying step has ceased to be recognized, outing data carrier identification information which is still recognized even when the user has gone out of the predetermined area from among the outing data carrier identification information stored in the outing data carrier identification information provisional storing step based on the time at which the outing data carrier identification information is stored in the outing data carrier identification information provisional storing step.

BRIEF DESCRIPTION OF THE DRAWINGS

FIG. 14 is a diagram showing an RFID category storage table according to the second embodiment of the present invention.

FIG. 15 is a diagram showing an outing ID provisional storage table according to the second embodiment of the present invention.

FIG. 16 is a diagram showing an outing ID storage table according to the second embodiment of the present invention.

BEST MODE FOR CARRYING OUT THE INVENTION

[Embodiment 1]

A first embodiment of the present invention will be described with reference to the drawings.

Figure 1:
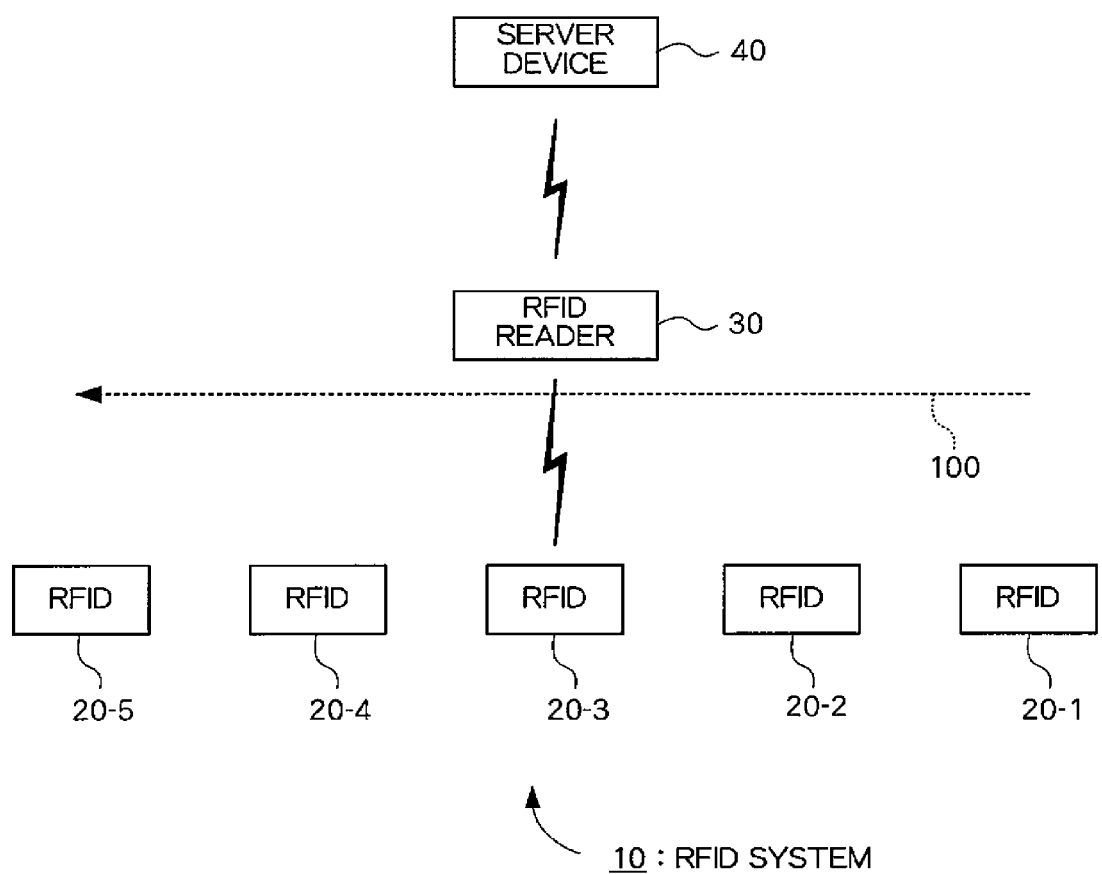
FIG. 1 is a diagram showing a system configuration of an RFID system according to a first embodiment of the present invention.

FIG. 1 is a system configuration diagram of an RFID system 10 according to this embodiment. As shown in the figure, the RFID system 10 includes a plurality of RFIDs 20, an RFID reader 30, and a server device 40.

Each RFID 20 is a device functioning as a data carrier capable of storing data, and is attached to a moving object or a fixed object. Further, each RFID 20 is configured such that data stored therein can be read by the RFID reader 30 in a non-contact state. Specifically, each RFID 20 may be configured such that the data is read by modulating a magnetic field generated by the RFID reader 30 according to the stored data (passive type or semi-passive type), or may be configured such that the data is read by transmitting radio waves according to the stored data in a case where radio waves transmitted from the RFID reader 30 are received (active type).

Each RFID 20 is assigned identification information by which the RFID 20 can be uniquely identified among the plurality of RFIDs 20. Each RFID 20 stores the identification information assigned to itself as a part of the stored data.

The RFID reader 30 is installed in, for example, a cellular phone, and is configured to be capable of reading the data stored in each of the RFIDs 20. Specifically, the RFID reader 30 transmits a readout signal to each of the RFIDs 20, and receives a data signal sent back in response to the readout signal. The data signal includes data stored in each RFID 20, and the RFID reader 30 obtains the data stored in the RFID 20 from the data signal. As described above, the RFID 20 stores identification information, and the RFID reader 30 obtains the identification information included in the data signal to thereby function as a reader device.

The RFID reader 30 is connected to the server device 40 via a mobile communications system such as a cellular phone system or a wireless LAN system, and is configured to send predetermined information to the sever device 40. Further, the RFID reader 30 includes a GPS receiver so as to be capable of obtaining its own position information.

The server device 40 is connected to the mobile communications system so as to be connected to the RFID reader 30. The server device 40 stores information to be provided to the RFID reader 30 and any other device (not shown), and selects information corresponding to the information received from the RFID reader 30 and transmits the information thus selected to the RFID reader 30 or the other device.

Figure 2:
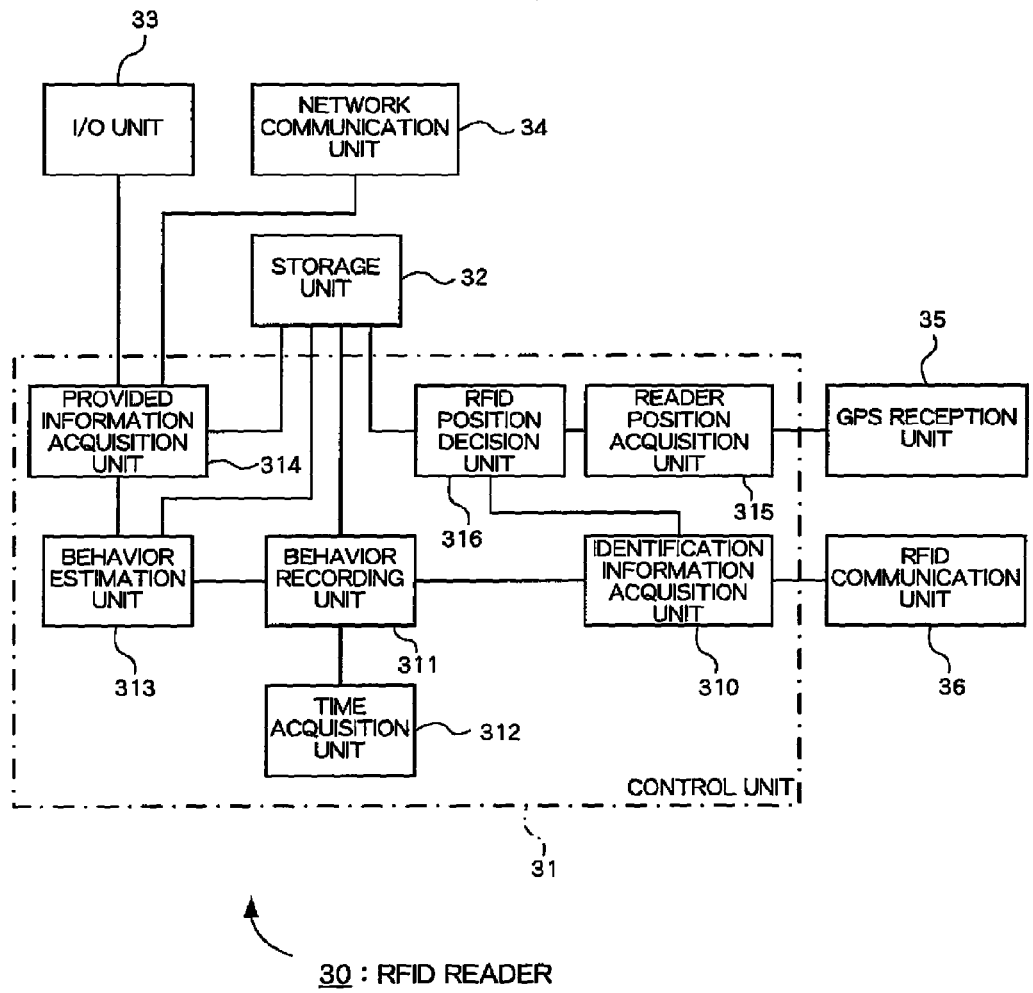
FIG. 2 is a functional block diagram showing an RFID reader according to the first embodiment of the present invention.

The function of the RFID reader 30 will be described in detail. FIG. 2 is a functional block diagram showing functional blocks of the RFID reader 30.

The RFID reader 30 functionally includes, as shown in FIG. 2, a control unit 31, a storage unit 32, an I/O unit 33, a network communication unit 34, a GPS reception unit 35, and an RFID communication unit 36. Further, the control unit 31 includes an identification information acquisition unit 310, a behavior recording unit 311, a time acquisition unit 312, a behavior estimation unit 313, a provided information acquisition unit 314, a reader position acquisition unit 315, and an RFID position decision unit 316.

The control unit 31 includes a processing unit for executing programs stored in the storage unit 32, and controls each unit of the RFID reader 30. Further, the control unit 31 performs various processes such as an RFID periodic read process, an RFID position information decision process, a representative position decision process, a moving/fixed distinction judgment process, and a representative position calculation process, all of which are to be described later.

The storage unit 32 stores programs for carrying out this embodiment. The storage unit 32 also functions as a work memory for the control unit 31.

As described above, the RFID 20 is attached to a moving object or a fixed object and used. Accordingly, the storage unit 32 stores information on each RFID 20 as to whether the RFID 20 is a moving ID attached to a moving object or a fixed ID attached to a fixed object. Then, with respect to the RFID 20 categorized as a fixed ID or the RFID 20 yet to be categorized, the storage unit 32 stores position information indicating a position at which each RFID 20 is installed in correlation with the identification information of the RFID 20. The position information stored in correlation with identification information in the storage unit 32 is referred to as registered position information.

The I/O unit 33 is a human-machine interface with respect to a user of the RFID reader 30. Specifically, a keypad, a microphone, a speaker, and the like may be used as the I/O unit 33. The control unit 31 receives an input from a user and notifies the user of information through the I/O unit 33.

The network communication unit 34 includes an antenna and is configured to be capable of communicating with the base station device in the mobile communications system. The control unit 31 communicates with the server device 40 through the network communication unit 34.

The GPS reception unit 35 includes a GPS receiver, and receives radio waves from a plurality of GPS satellites, to thereby calculate the global position, that is, the latitude and longitude of the position of the RFID reader 30. Then, the GPS reception unit 35 outputs position information indicating the position of the RFID reader 30 thus calculated to the control unit 31.

The RFID communication unit 36 transmits radio waves to an RFID 20 to thereby read data stored in the RFID 20. Then the data thus read is output to the control unit 31.

Hereinbelow, the function of the RFID reader 31 will be described in detail. When the RFID reader 30 is carried by a person, the RFID communication unit 36 periodically reads data stored in a certain RFID 20 located in the vicinity of a location where the person is present (in a range where the RFID communication unit 36 can transmit and receive radio waves to and from the RFID 20). When the person moves, the RFID communication unit 36 also reads data from another RFID 20 located in the vicinity of the travelling route along with the movement of the person. With reference to FIG. 1, in a case where the RFID reader 30 moves along a travelling route 100, the RFID communication unit 36 reads out data from an RFID 20-1, an RFID 20-2, an RFID 20-3, an RFID 20-4, and RFID 20-5 in the stated order. Then the RFID communication unit 36 outputs the data thus read to the identification information acquisition unit 310.

The identification information acquisition unit 310 obtains the identification information of respective RFIDs 20 from the input data, and outputs the identification information to the behavior recording unit 311. The behavior recording unit 311 reads out the registered position information stored in correlation with the identification information of respective RFIDs 20 thus input in the storage unit 32. Here, the time acquisition unit 312 obtains times at which the RFID communication unit 36 has read data stored in respective RFIDs 20 and outputs the times to the behavior recording unit 311.

The behavior recording unit 311 correlates the inputted time at which data stored in an RFID 20 is read with the registered position information of the RFID 20, and stores the time and the position information in the personal behavior recording table (not shown). In other words, the registered position information of respective RFIDs 20 is stored as personal position information indicating the position of an individual carrying the RFID reader 30.

Human behavior is generally patternized in most cases. For example, the human behavior is typified by such a case that when a certain person leaves home at 8 o'clock in the morning on a weekday, the person often goes to a station. This case indicates that the behavior of the person in the mornings on weekdays is patternized. The behavior recording unit 311 learns individual behavior patterns based on the data stored in the aforementioned personal behavior recording table, and stores the result of the learning in the storage unit 32. Specifically, the storage unit 32 may be provided with, for example, a neural network, and cause the neural network to learn time-varying changes in the personal position information.

The behavior recording unit 311 outputs, to the behavior estimation unit 313, the position information of an RFID 20 storing the identification information newly obtained by the identification information acquisition unit 310 and the time at which the RFID communication unit 36 has read the data stored in the RFID 20. The behavior estimation unit 313 detects that the person has started moving based on the change in the registered position information input. Then upon detecting the start of the movement, the behavior estimation unit 313 estimates the destination of the person based on the behavior pattern that has been learned by the storage unit 32. The behavior estimation unit 313 then outputs destination information indicating the destination thus estimated to the provided information acquisition unit 314.

The provided information acquisition unit 314 obtains information corresponding to the destination information thus input, and notifies the user of the information through the I/O unit 33. At this time, the provided information acquisition unit 314 may transmit the destination information to the server device 40 through the network communication unit 34. In this case, the server device 40 selects information corresponding to the destination information thus received, from among the information stored therein, and transmits the information thus selected to the RFID reader 30 or any other device (not shown). The RFID reader 30 receives information transmitted from the server device 40 by the provided information acquisition unit 314, and notifies the user of the information through the I/O unit 33. In a case where the information is transmitted to the other device, the other device performs a predetermined process according to the information, for example, notifying its own user of the information transmitted from the server device 40.

According to this embodiment, the registered position information of an RFID 20 stored in the RFID reader 30 is decided by the RFID reader 30 itself. Accordingly, the reader position acquisition unit 315 acquires, when the identification information of the RFID 20 is obtained by the identification information acquisition unit 310, reader position information indicating the position of the RFID reader 30 input from the GPS reception unit 35. Then, the RFID position decision unit 316 decides, based on the reader position information thus obtained, the position of the RFID 20 from which data has been read, and stores the identification information of the RFID 20 and the position information thereof in the storage unit 32 by correlating the identification information and the position information with each other, to thereby perform the RFID position information decision process.

Figure 3:
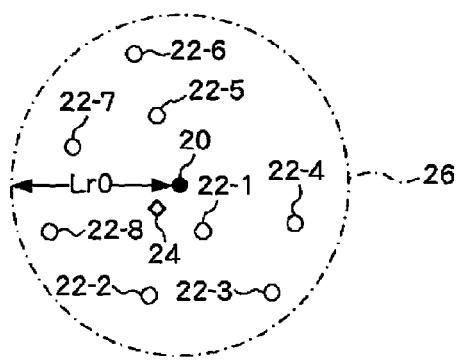
FIG. 3 is an explanatory diagram for explaining a concept of an RFID position information decision process according to the first embodiment of the present invention.

FIG. 3 is an explanatory diagram for explaining a concept of the RFID position information decision process. FIG. 3 shows an RFID 20 and positions in the vicinity of the RFID 20. The RFID reader 30 obtains reader position information within a range 26 (within a circle with a predetermined distance Lr0 from the RFID 20, provided that no shield exists) in which the RFID reader 30 is capable of transmitting and receiving radio waves to and from the RFID 20. The RFID reader 30 repeatedly obtains the reader position information to thereby obtain the reader position information for a number of times in the vicinity of the RFID 20. In the figure, positions which are indicated by the reader position information obtained by the reader position acquisition unit 315 when the identification information acquisition unit 310 obtains the identification information of the RFID 20 are indicated as a detection position 22-1 to a detection position 22-8. The RFID position decision unit 316 stores detection position information of those detection positions in the storage unit 32. In the RFID position information decision process, the registered position of the RFID 20 is decided based on the detection position information thus stored.

Specifically, for example, a least-square method adopted in the representative position calculation process described later is used to calculate a representative position 24 of a plurality of detection positions indicated by the detection position information. Then the representative position 24 is decided as the registered position of the RFID 20. The registered position of the RFID 20 is correlated with the identification information of the RFID 20 and stored, in the storage unit 32, as the registered position information. The representative position 24 thus calculated may often be different from the position of the RFID 20 in a strict sense, but substantially indicates the position of the RFID 20.

Figures 4, 5:
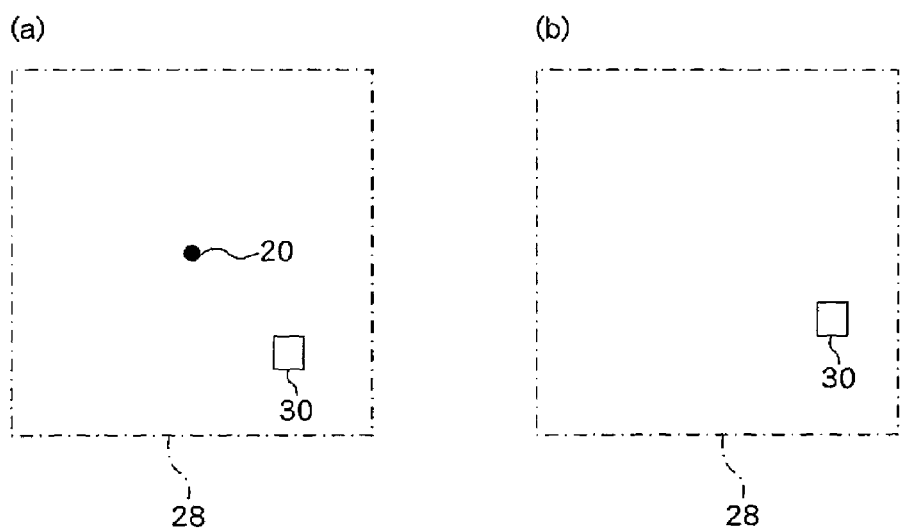
FIG. 4 is an explanatory diagram for explaining a moving ID according to the first embodiment of the present invention, in which part (a) is a diagram indicating a predetermined area at a predetermined time, and part (b) is a diagram indicating a predetermined area at a point in time after a lapse of predetermined time from the predetermined time.
FIG. 5 is a diagram showing an identification information storage table according to the first embodiment of the present invention.

As described above, the RFID 20 includes a fixed ID and a moving ID. FIG. 4 is an explanatory diagram for explaining the moving ID. In FIG. 4(a), the RFID 20 exists within an area 28. The area 28 is a certain geographical area defined by, for example, the latitude and longitude. The RFID reader 30 within the area 28 is capable of reading data stored in the RFID 20. Meanwhile, FIG. 4(b) shows the area 28 after a lapse of a certain period of time from FIG. 4(a). As shown in FIG. 4(b), when the RFID reader 30 has re-entered the area 28 after a lapse of a certain period of time, the RFID 20 has already gone out of the area 28, and therefore the RFID reader 30 is no longer capable of reading data stored in the RFID 20.

As described above, the position of the RFID 20 stored as a moving ID moves over time, which makes it difficult to decide the representative position thereof by the aforementioned RFID position information decision process. Therefore, the RFID position decision unit 316 decides the representative position with respect to an RFID 20 stored as a fixed ID.

Also, the RFID position decision unit 316 judges whether an RFID 20 has moved or not, based on the registered position information of the RFID 20 stored in correlation with the identification information of the RFID 20 in the storage unit 32 and on the reader position information obtained by the reader position acquisition unit 315 when the identification information acquisition unit 310 has obtained the identification information of the RFID 20. Specifically, if no reader position information is found within a range in which a certain RFID 20 can transmit and receive radio waves to and from the RFID communication unit 36 from a position indicated by the registered position information of the RFID 20 (within a circle with a radius of Lr0 of FIG. 3), the identification of the RFID 20 cannot be obtained by the identification information acquisition unit 310 as long as the RFID 20 has not moved. Accordingly, the RFID position decision unit 316 judges whether or not the distance between the position indicated by the reader position information of a certain RFID 20 which is obtained when the identification information acquisition unit 310 has obtained the identification information of the RFID 20 and the position indicated by the registered position information of the RFID 20 is equal to or smaller than the maximum distance at which radio waves can be transmitted and received between the RFID communication unit 36 and the RFID 20 (the distance which falls within a circle of a radius of Lr0 of FIG. 3). Then, in the case where the judgment result is positive, the RFID position decision unit 316 judges that the RFID 20 has not moved from the registered position, and in the case where the judgment result is negative, the RFID position decision unit 316 judges that the RFID 20 has moved from the registered position.

Further, the RFID position decision unit 316 performs a moving/fixed distinction judgment process in which the RFID position decision unit 316 calculates, based on a plurality of position information stored in correlation with the identification information of an RFID 20, the degree of dispersion of positions indicated by the plurality of position information, to thereby judge whether the RFID 20 is a fixed ID or a moving ID based on the calculation result.

Hereinbelow, the RFID position information decision process and other processes will be described in detail with reference to the processing flowchart of the RFID position decision unit 316.

First, a description will be given of a table used in the RFID position information decision process. FIG. 5 is a diagram showing an identification information storage table stored in the storage unit 32. As shown in the figure, the storage unit 32 stores, in correlation with the identification information of each RFID 20, a fixed ID/moving ID distinction, the registered position information, a position movement possibility flag, the number of position information, a position information group, the number of provisional position information, and a provisional position information group. The RFID position information decision process is conducted with reference to the identification information storage table.

In this case, the position information group stores the reader position information obtained each time when the identification information is obtained by the identification information acquisition unit 310 for the past predetermined times. The provisional position information group stores the reader position information obtained each time when the identification information stored in an RFID 20 is obtained by the identification information acquisition unit 310 in a situation where it is decided that the RFID 20 may possibly be a moving ID (described later), for the past predetermined times.

The number of position information and the number of provisional position information store the number of position information (reader position information) stored in the position information group and the number of position information (reader position information) stored in the provisional position information group, respectively.

Figure 6:
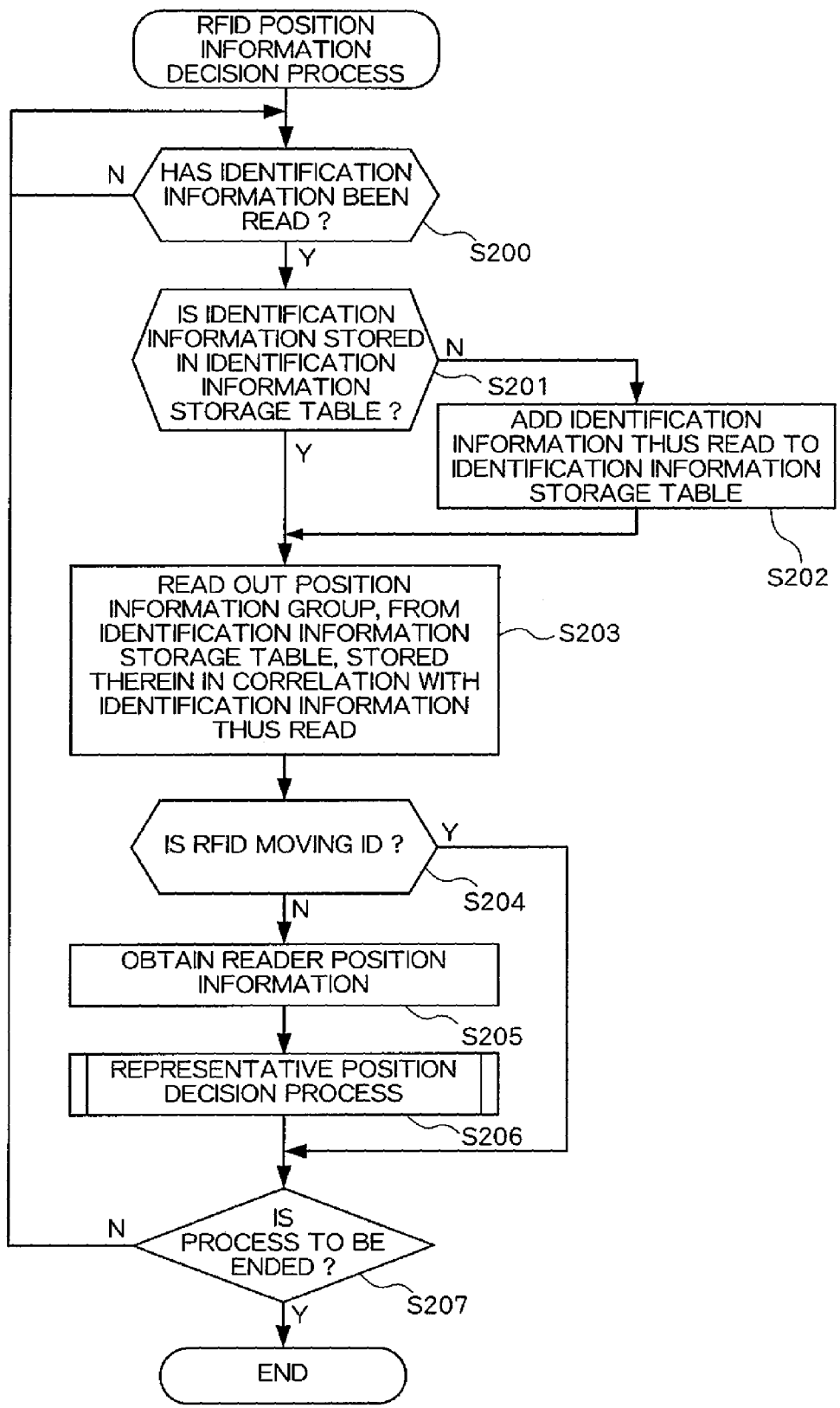
FIG. 6 is a flowchart of processing according to the first embodiment of the present invention.

FIG. 6 is a flowchart of the RFID position information decision process. As shown in the figure, the RFID position decision unit 316 first judges whether identification information has been read by the identification information acquisition unit 310 (S200). If the identification information is yet to be read, the RFID position decision unit 316 stands by until the identification information is read. If the identification information has already been read, the RFID position decision unit 316 judges whether the identification information thus read is stored in the identification information storage table (S201). If the identification information is not stored in the identification information storage table, the identification information thus read is added to the table (S202). At this time, the fixed ID/moving ID distinction, the registered position information, the number of position information, the position information group, the number of provisional position information, and the provisional position information group, which are stored in correlation with the identification information in the table, each store a NULL value. The position movement possibility flag stores an OFF value.

Next, the RFID position decision unit 316 reads out the position information group stored in correlation with the identification information thus read in the identification information storage table (S203).

Then, the RFID position decision unit 316 checks the fixed ID/moving ID distinction stored in correlation with the identification information thus read, to thereby determine whether an RFID storing the identification information is a moving ID or not (S204). If the RFID is a moving ID, the processes of S205 and S206 are skipped, and it is determined whether to end the process (S207). To determine whether to end the process is to determine whether or not to end the RFID position information decision process performed by the RFID position decision unit 316, and in a case where it is not to end the process, the RFID position decision unit 316 repeatedly performs the process with respect to newly-read identification information.

In a case where an RFID 20 storing the identification information thus read is not a moving ID, the reader position information at this point of time is obtained from the reader position acquisition unit 315. Then a representative position decision process for deciding the aforementioned representative position is performed (S206).

Figure 7:
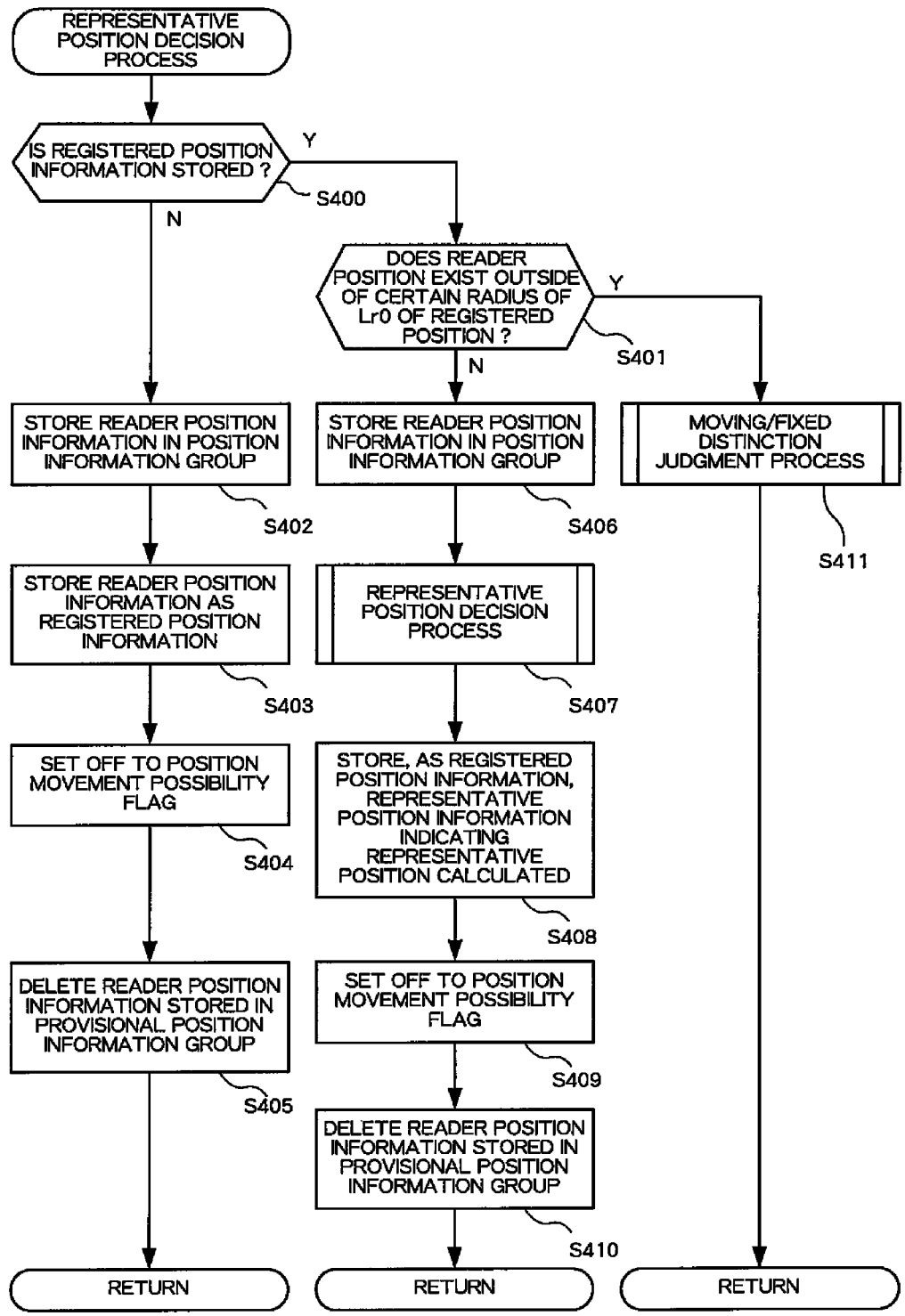
FIG. 7 is a flowchart of processing according to the first embodiment of the present invention.

FIG. 7 is a flowchart of the representative position decision process. As shown in the figure, the RFID position decision unit 316 first judges whether the registered position information is stored in correlation with the identification information thus read (S400). If the registered position information is stored, the RFID position decision unit 316 judges whether or not the position of the RFID reader 30 indicated by the reader position information exists outside a certain radius of Lr0 from the position indicated by the registered position information stored (S401). In other words, the RFID position decision unit 316 judges whether the distance between the position of the RFID reader 30 and the registered position of the RFID 20 is equal to or larger than Lr0.

If it is judged in S400 that the registered position information is not stored in correlation with the identification information read by the RFID position decision unit 316, the reader position information obtained in S205 is additionally stored in the position information group stored in correlation with the identification information read (S402). Also, the reader position information thus stored is stored, as the registered position information, in correlation with the identification information thus read in the identification information storage table (S403). Further, OFF is set for the position movement possibility flag correlated with the identification information thus read (S404). Meanwhile, if the reader position information is stored in the provisional position movement information group, all of the reader position information stored in the provisional position movement information group are deleted (S405). After the above-mentioned processes, the process returns to the RFID position information decision process.

If it is judged in S401 that the position of the RFID reader 30 indicated by the reader position information does not exist outside a certain radius of Lr0 from the position indicated by the registered position information stored, the reader position information obtained in S205 is additionally stored in the position information group stored in correlation with the identification information thus read (S406). Then the representative position calculation process described later is performed, to thereby calculate a representative position based on a plurality of reader position information stored in the position information group (S407). Then the registered position information indicating the representative position thus calculated is stored in correlation with the identification information thus read in the identification information storage table (S408). Further, OFF is set for the position movement possibility flag correlated with the identification information thus read (S409). Meanwhile, if the reader position information is stored in the provisional position movement information group, all of the reader position information stored in the provisional position movement information group are deleted (S410). After the above-mentioned processes, the process returns to the RFID position information decision process.

If it is judged in S401 that the position of the RFID reader 30 indicated by the reader position information exists outside a certain radius of Lr0 from the position indicated by the registered position information stored, the RFID position decision unit 316 performs the moving/fixed distinction judgment process (described later) for deciding whether the identification information thus read is for a moving ID or a fixed ID (S411). Then the process returns to the RFID position information decision process.

Figure 8:
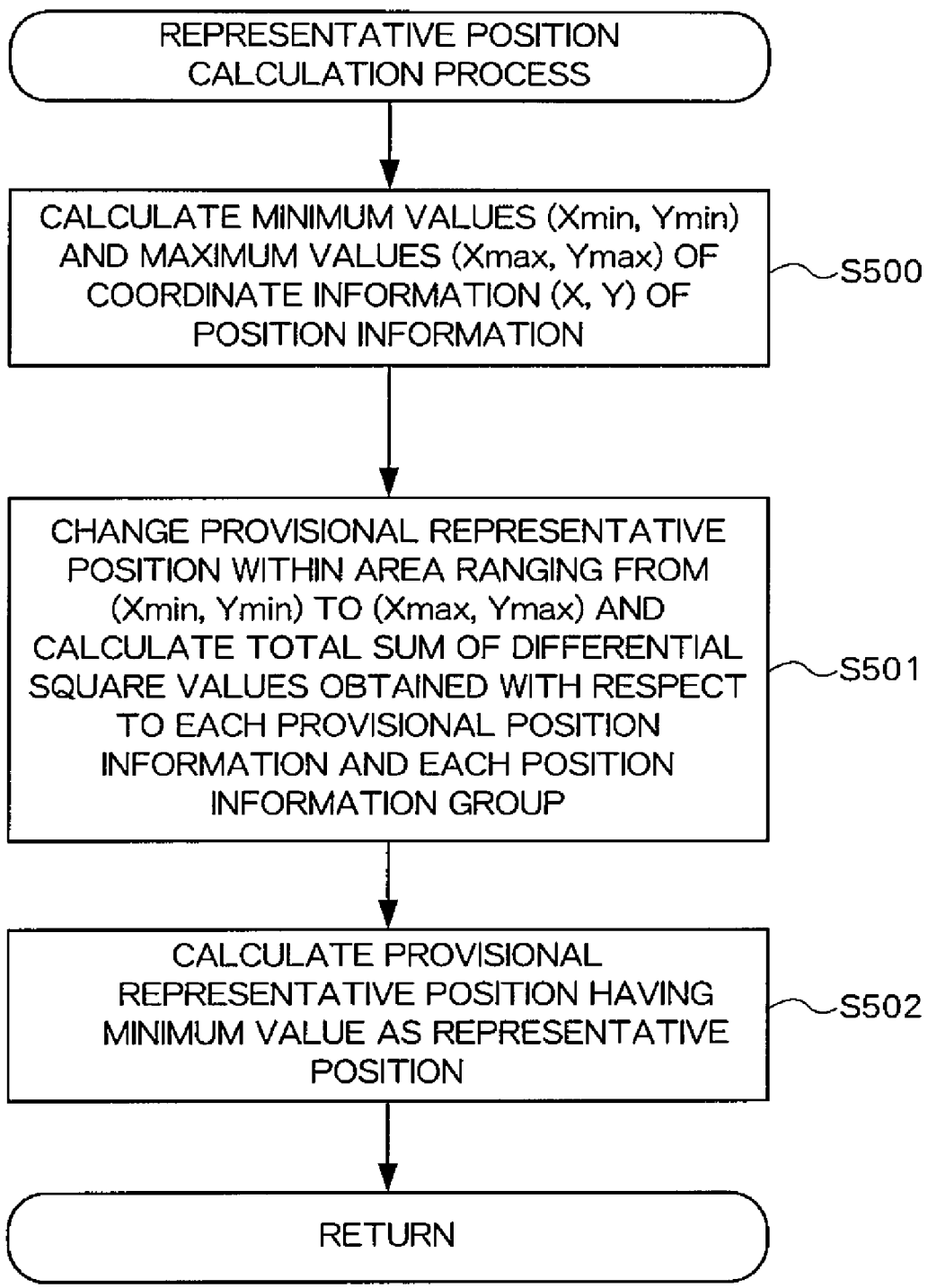
FIG. 8 is a flowchart of processing according to the first embodiment of the present invention.

FIG. 8 is a flowchart of the representative position calculation process. As shown in the figure, the RFID position decision unit 316 first calculates the minimum values and the maximum values of the coordinate information of the reader position information included in the position information group stored in correlation with the identification information thus read (S500). Specifically, in order to obtain an area including all of the reader position information corresponding to the number indicated by the number of position information, the maximum value and the minimum value are selected as to each of the X-coordinate and the Y-coordinate of reader position information in the X-Y plane coordinates. Then, the position coordinate defined by the maximum value of the X-coordinate and the maximum value of the Y-coordinate and the position coordinate defined by the minimum value of the X-coordinate and the minimum value of the Y-coordinate are obtained, to thereby calculate the minimum value and the maximum value of the coordinate information of the reader position information. According to this embodiment, the area described above is obtained in a rectangle, while it is of course possible that the area is obtained in any other shape.

Next, the RFID position decision unit 316 secures a storage area for a variable "provisional representative position", and changes the value of the variable within a range of the aforementioned rectangular area. Then, as to the respective values of the "provisional representative position", a total sum of differential square values obtained with respect to the position information stored in the position information group is calculated (S501). After that, one of the values of "provisional representative positions" which is minimum in the total sum is calculated as the representative position (S502). Specifically, the RFID position decision unit 316 changes the "provisional representative position", to thereby select the "provisional representative position" which is most appropriately representing the reader position information included in the position information group, and decides the selected "provisional representative position" as a representative position.

Figure 9:
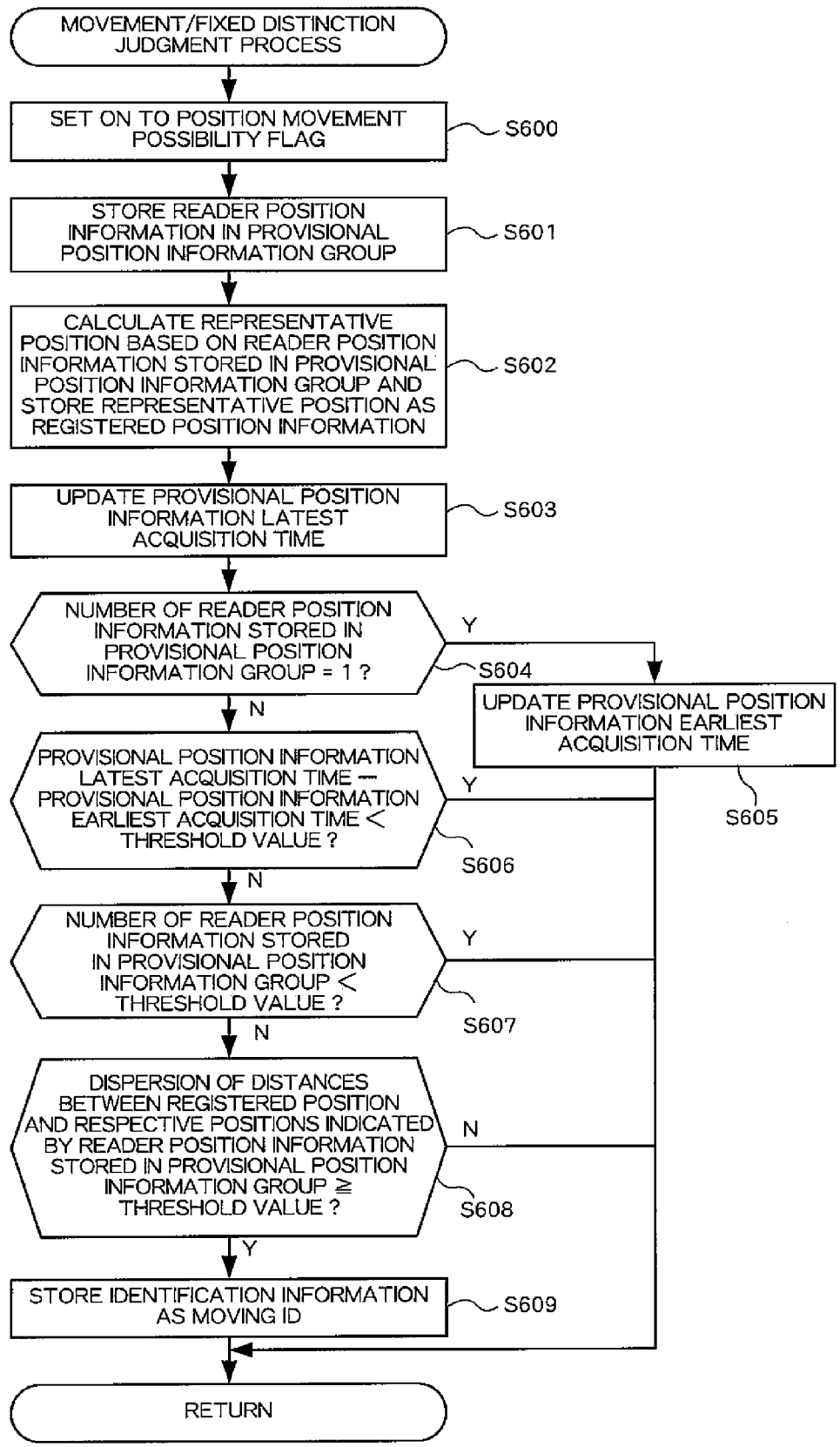
FIG. 9 is a flowchart of processing according to the first embodiment of the present invention.

FIG. 9 is a flowchart of the moving/fixed distinction judgment process. As shown in the figure, the RFID position decision unit 316 first sets ON to the position movement possibility flag stored in correlation with the identification information thus read (S600). In the process of S401 which precedes this process, it has been judged that the distance between the position of the RFID reader 30 at a point of time when the identification information stored in the RFID 20 is read by the RFID reader 30 and the registered position of the RFID 20 is equal to or larger than Lr0, and therefore it is assumed that the RFID 20 has moved. Accordingly, ON is set for the position movement possibility flag.

Then, the reader position information obtained in S205 is additionally stored in the provisional position information group stored in correlation with the identification information thus read (S601).

Next, the RFID position decision unit 316 calculates, based on the reader position information group stored in the provisional position information group, the representative position of the identification information thus read, and stores the registered position information indicating the representative position thus calculated in correlation with the identification information thus read in the identification information storage table (S602). This representative position calculation process based on the reader position information group stored in the provisional position information group is similar to the aforementioned representative position calculation process based on the reader position information group stored in the position information group.

Then the RFID position decision unit 316 secures a storage area for a variable "Provisional position information latest acquisition time" while obtaining the current time from the time acquisition unit 312, and substitutes the current time thus obtained for the variable "provisional position information latest acquisition time" (S603).

Next, the RFID position decision unit 316 judges whether the number of reader position information included by the provisional position information group stored in correlation with the identification information thus read is one or not (S604). If the judgment result is positive, a storage area for a variable "provisional position information earliest acquisition time" is secured and the variable "provisional position information latest acquisition time" is substituted therefor (S605). That is, a time at which position information obtained earliest in terms of time, of the position information stored in the provisional position information group, was obtained is stored. After the process of S605 ends, the RFID position decision unit 316 ends the moving/fixed distinction judgment process.

On the other hand, in the case where the judgment result of S604 is negative, the variable "provisional position information earliest acquisition time" should have already been stored, and therefore the RFID position decision unit 316 obtains a difference between the variable "provisional position information latest acquisition time" and the variable "provisional position information earliest acquisition time". The RFID position decision unit 316 then judges whether the difference is less than a predetermined threshold value (S606). The RFID position decision unit 316 also judges whether the number of provisional position information is less than a predetermined threshold value (S607). In other words, in the processes of S606 and S607, the RFID position decision unit 316 judges whether the time elapsed since when ON is set for the position movement possibility flag has exceeded a predetermined threshold value or not. In a case where one of the judgment results in S606 and S607 is positive, that is, in a case where the time elapsed since when ON is set for the position movement possibility flag has not exceeded a predetermined threshold value, the RFID position decision unit 316 ends the moving/fixed distinction judgment process.

In a case where both of the judgment results in S606 and S607 are negative, that is, in a case where the time elapsed since when ON is set for the position movement possibility flag has exceeded a predetermined threshold value, the RFID position decision unit 316 calculates the dispersion of the distances between the registered position and respective positions indicated by the reader position information stored in the provisional position information group (S608). The RFID position decision unit 316 obtains the degree of dispersion of the positions of an RFID 20 based on the calculation of the dispersion. When the dispersion is equal to or larger than a predetermined threshold value, that is, the degree of dispersion is equal to or larger than a predetermined value, the fixed ID/moving ID distinction stored in correlation with the identification information thus read is set as moving ID, to thereby store the RFID 20 storing the identification information as a moving ID (S609).

Figure 10:
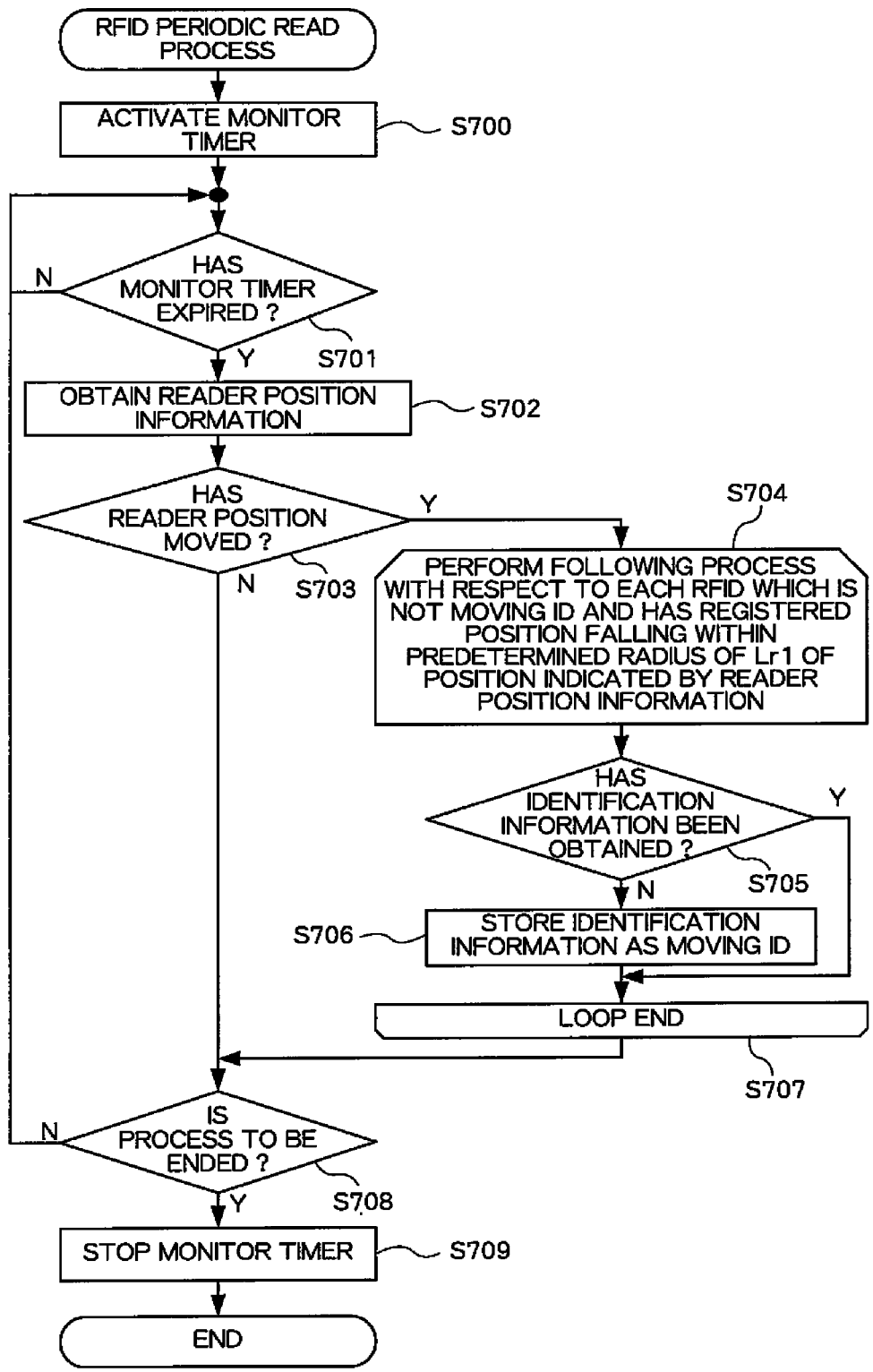
FIG. 10 is a flowchart of processing according to the first embodiment of the present invention.

The RFID position decision unit 316 also performs another process, besides the aforementioned moving/fixed distinction judgment process, in which the RFID position decision unit 316 periodically reads identification information stored in an RFID 20, to thereby judge whether the RFID 20 is a moving ID or not. Hereinbelow, a description will be given of an RFID periodic read process with reference to a flowchart shown in FIG. 10.

First, the RFID position decision unit 316 activates a monitor timer (S700), and then judges whether the monitor timer has expired or not (S701). Specifically, the monitor timer is configured to expire at predetermined time intervals, and the RFID position decision unit 316 judges whether the predetermined time has elapsed since the activation of the monitor timer or since the lapse of a previous predetermined time. When the monitor timer expires, the RFID position decision unit 316 obtains the reader position information from the reader position acquisition unit 315 (S702). The reader position information is stored when acquired. The RFID position decision unit 316 compares the reader position information obtained in S702 with the reader position information which has already been stored, to thereby judges whether the RFID reader 30 has moved or not (S703). If it is judged that the RFID reader 30 has not moved, the processes from S704 to S707 are skipped, and it is determined whether to end the process. To determine whether to end the process is to determine whether or not to end the RFID periodic read process performed by the RFID position decision unit 316, and in the case where it is not to end the process, the RFID position decision unit 316 repeatedly perform the process every time the monitor timer expires. In the case of ending the process, the monitor timer is stopped, to thereby end the process (S709).

In the case where it is judged in S703 that the RFID reader 30 has moved, judgment is made on respective RFIDs of the RFIDs, which are not stored as moving ID in the identification information storage table and have the registered position stored as the registered position information thereof within a predetermined radius of Lr1 of the position indicated by the reader position information obtained in S702 (i.e., the distance between the registered position and the position indicated by the reader position information falling within Lr1), as to whether identification information thereon has been obtained in the identification information acquisition unit 310 (S704, S705, and S707). The Lr1 in this case is distance information indicating a range in which the RFID communication unit 36 and the RFID 20 are supposed to be capable of transmitting and receiving radio waves therebetween.

The RFID position decision unit 316 sets, as to the identification information which has not been obtained, the fixed ID/moving ID distinction of the identification information storage table as moving ID (S706). Specifically, the identification information of an RFID 20 should have been obtained in the identification information acquisition unit 310 as long as the RFID 20 has a registered position thereof within a range in which the RFID reader 30 and the RFID 20 are capable of communicating with each other. Accordingly, a case where the identification information of an RFID 20 has not been obtained means that the RFID 20 has moved. Therefore, the RFID position decision unit 316 decides an RFID 20 having the identification information yet to be obtained as being moving ID.

In the manner as described above, it is possible to correlate the reader position information indicating the position of the RFID reader 30 when reading identification information from an RFID 20 with the identification information of the RFID 20, as the position of the RFID 20, which eliminates the need for manual operation of storing the position information of the RFID 20. Also, it is possible to more accurately decide, based on a plurality of reader position information, the registered position information indicating the position in which the RFID 20 is installed.

Also, the RFID reader 30 can judge whether an RFID 20 has moved or not, and whether the RFID 20 is the one attached to a moving object.

[Embodiment 2]

A second embodiment of the present invention will be described with reference to the drawings.

Figure 11:
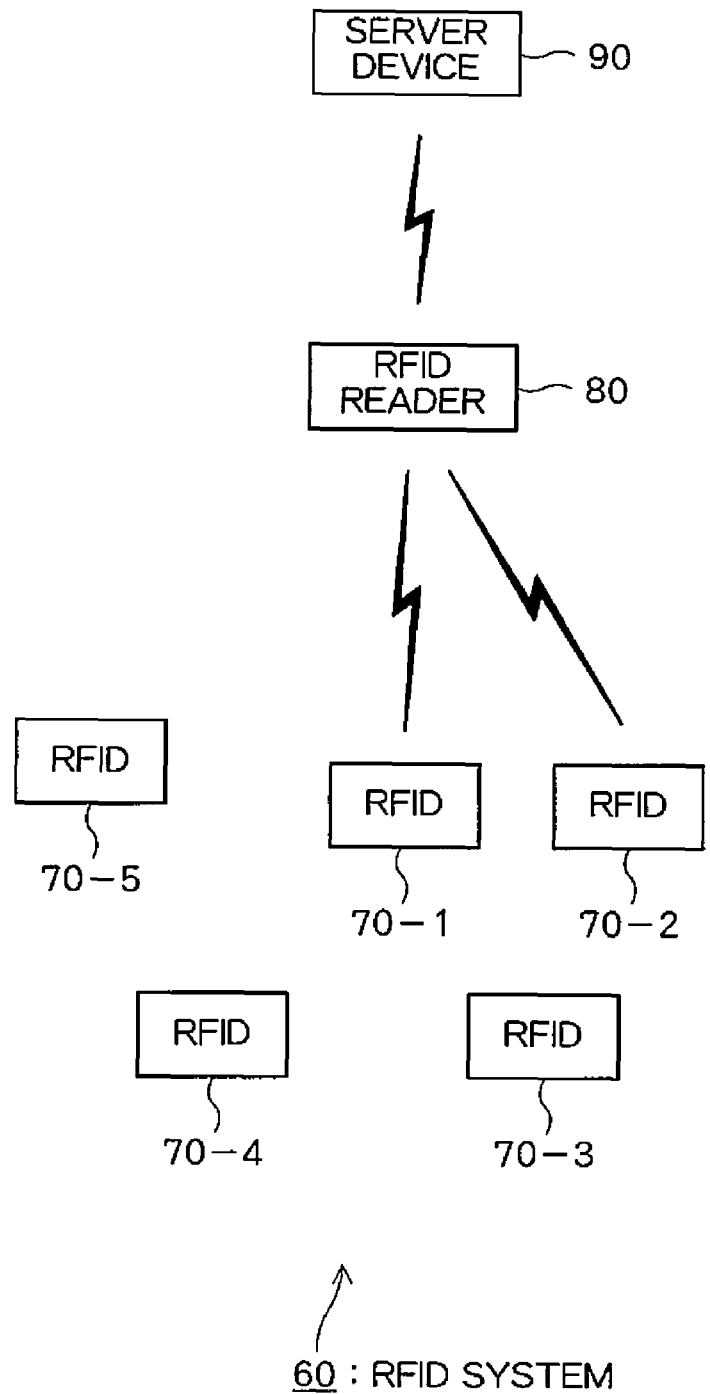
FIG. 11 is a diagram for showing a system configuration of an RFID system according to a second embodiment of the present invention.

FIG. 11 is a system configuration diagram of an RFID system 60 according to this embodiment. As shown in the figure, the RFID system 60 includes a plurality of RFIDs 70, an RFID reader 80, and a server device 90.

Each RFID 70 is a device functioning as a data carrier capable of storing data, and is attached to a moving object or a fixed object. Each RFID 70 is configured such that data stored therein (stored data) can be read by the RFID reader 80 in a non-contact state. Specifically, each RFID 70 may be configured such that the data is read by modulating a magnetic field generated by the RFID reader 80 according to the stored data (passive type or semi-passive type), or may be configured such that the data is read by transmitting radio waves according to the stored data in a case where radio waves transmitted from the RFID reader 80 are received (active type).

Each RFID 70 is assigned identification information (RFID information) by which the RFID 70 can be uniquely identified among the plurality of RFIDs 70. Each RFID 70 stores the identification information assigned to the own device as a part of the stored data.

The RFID reader 80 is installed in, for example, a cellular phone and is configured so as to read data stored in the RFID 70. Specifically, the RFID reader 80 transmits a readout signal to the RFID 70 and receives a data signal returned in response to the readout signal. The data signal contains data stored in the RFID 70, and the RFID reader 80 acquires data stored in the RFID 70 from the data signal. Note that the RFID 70 stores the identification information as described above, and the RFID reader 80 also functions as an identification information reader device by acquiring the identification information contained in the data signal.

The RFID reader 80 is carried by a person, and acquires identification information from RFIDs 70 capable of transmitting/receiving radio waves among the RFIDs 70 attached to various persons or objects. Accordingly, the RFID reader 80 recognizes the RFIDs 70 capable of transmitting/receiving radio waves.

The server device 90 is connected to the RFID reader 80 via a mobile communications system such as a cellular phone system or a wireless LAN system. Also, the server device 90 stores information to be provided (hereinafter, referred to as provided information) to the RFID reader 80 and any other device (not shown) in correlation with the identification information of the RFID 70. The RFID reader 80 transmits a readout signal for reading out the provided information to the server device 90, and the server device 90 that has received the readout signal selects the provided information corresponding to the readout signal from among all the provided information stored therein and transmits the information thus selected to the RFID reader 80.

The RFID reader 80 receives the provided information thus transmitted and provides the received provided information to each user.

Figure 12:
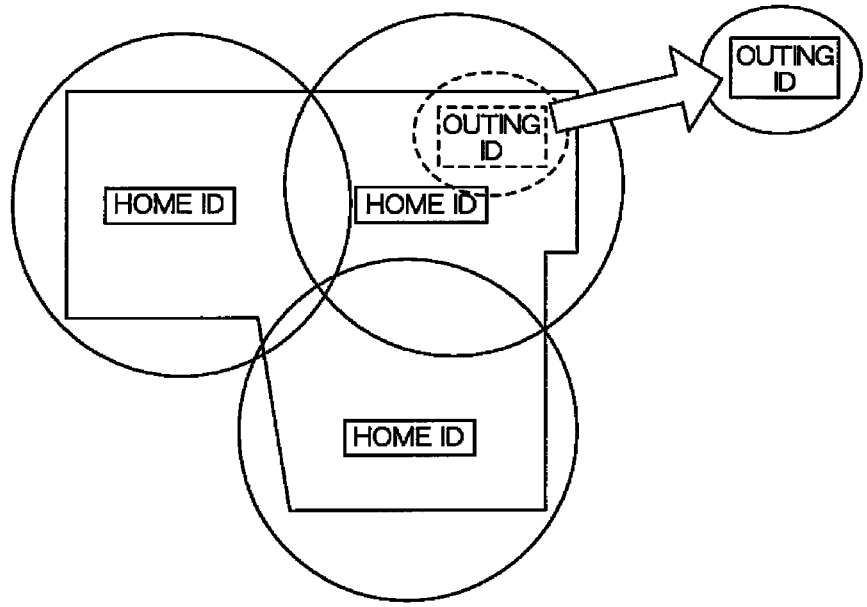
FIG. 12 is an explanatory diagram of an outing ID decision process according to the second embodiment of the present invention.

This embodiment makes it possible for the RFID reader 80 to receive, immediately before a user goes out, provided information (such as bus approach information and information on products on sale) to be needed by the user when being outside, from the server device 90. An outline of how the RFID reader 80 receives the provided information will be described with reference to FIG. 12. As shown in the figure, according to this embodiment, a plurality of RFIDs 70 are attached to a house of the user. Hereinafter, those RFIDs 70 attached to the house are referred to as home ID. The home IDs are arranged such that the RFID reader 80 can recognize any one of the home IDs when the RFID reader 80 is located in the house. The RFID reader 80 judges that the user is in the house as long as one of the plurality of home IDs (home ID group) is being recognized.

When the user leaves home, the user wears some of the RFIDs 70 as well as the RFID reader 80. The RFID reader 80 decides which one of the RFIDs 70 is worn by the user when going out (hereinafter, referred to as outing ID), and stores the identification information thereof. When the outing ID identified by the identification information thus stored is recognized, the RFID reader 80 transmits a readout signal to the server device 90, and the server device 90 selects the provided information corresponding to the readout signal and transmits the provided information thus selected to the RFID reader 80. In this manner, the RFID reader 80 can obtain, upon recognizing the outing ID, provided information to be needed by the user when being outside according to the outing ID thus recognized.

Figure 13:
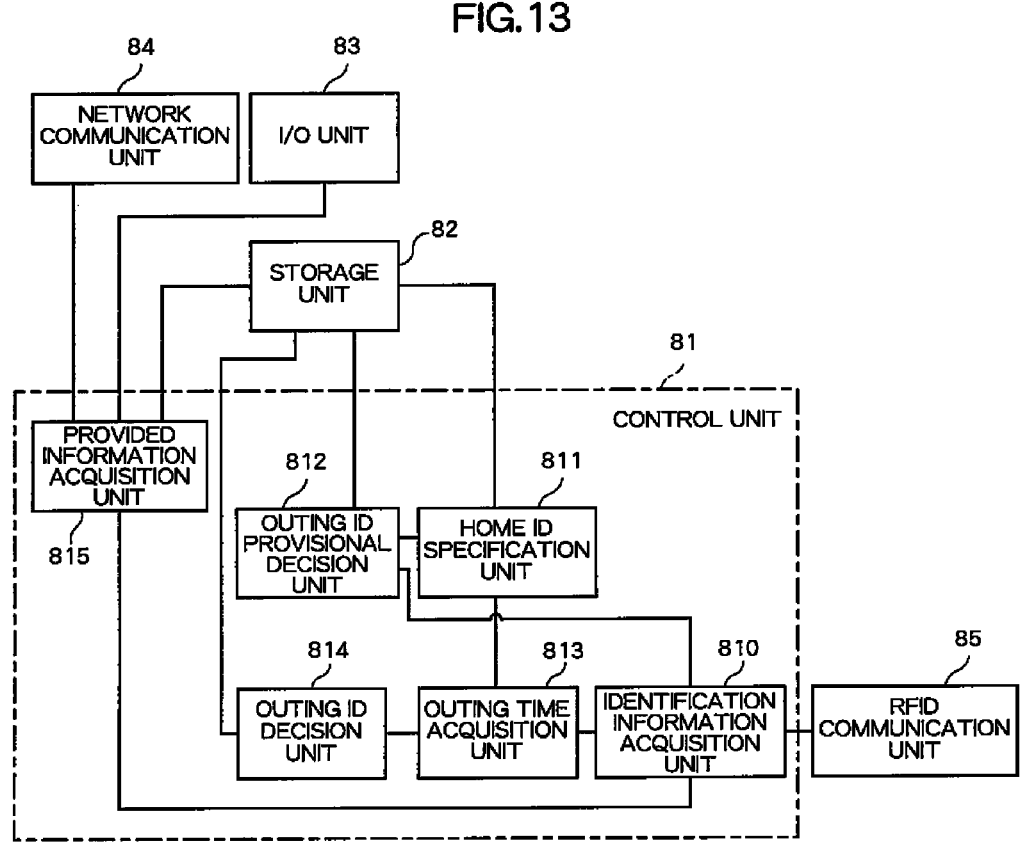
FIG. 13 is a diagram showing a functional block of an RFID reader according to the second embodiment of the present invention.

Hereinafter, functions of the RFID reader 80 will be described in detail. FIG. 13 is a functional block diagram showing functional blocks of the RFID reader 80.

As shown in FIG. 13, the RFID reader 80 functionally includes a control unit 81, a storage unit 82, an I/O unit 83, a network communication unit 84, and an RFID communication unit 85. The control unit 81 includes an identification information acquisition unit 810, a home ID specification unit 811, an outing ID provisional decision unit 812, an outing time acquisition unit 813, an outing ID decision unit 814, and a provided information acquisition unit 815.

The control unit 81 includes a processing unit for executing programs stored in the storage unit 82 and controls each unit of the RFID reader 80. Details of the control unit 81 will be described later.

The storage unit 82 stores programs for carrying out this embodiment. The storage unit 82 also functions as a work memory for the control unit 81. Further, the storage unit 82 stores a category of each of the RFIDs 70 in correlation with each identification information thereof.

FIG. 14 shows a specific example of the information stored in the storage unit 82. As shown in the figure, the categories include "home", "wearable", and "portable" indicating that each of the RFIDs 70 is the one installed at home, worn by a user, and carried by a user, respectively.

The I/O unit 83 is a human-machine interface with respect to a user of the RFID reader 80. Specifically, a keypad, a microphone, a speaker, and the like can be used as the I/O unit 83. The control unit 81 accepts an input from a user and provides the provided information to the user through the I/O unit 83.

The network communication unit 84 includes an antenna, and is configured to be capable of communicating with the base station device in the mobile communications system. The control unit 81 communicates with the server device 90 through the network communication unit 84, to thereby transmit a readout signal and receive provided information.

The RFID communication unit 85 transmits radio waves to an RFID 70, to thereby read data stored in the RFID 70. Then the RFID communication unit 85 outputs the data thus read to the control unit 81.

Hereinbelow, the function of the control unit 81 will be described in detail. When the RFID reader 80 is carried by a person, the RFID communication unit 85 periodically reads data stored in a certain RFID 70 located in the vicinity of a location where the person is present (in a range where the RFID communication unit 85 can transmit and receive radio waves to and from the RFID 70). If a certain RFID 70 is worn by a person, the data stored in the RFID 70 is read by the RFID reader 80. The RFID communication unit 85 outputs the data thus read to the identification information acquisition unit 810.

The identification information acquisition unit 810 obtains identification information of respective RFIDs 70 from the data thus input. In this manner, the identification information acquisition unit 810 recognizes the ones capable of transmitting/receiving radio waves among the plurality of RFIDs 70. The identification information acquisition unit 810 outputs the identification information of the RFID 70 thus recognized to the outing ID provisional decision unit 812, the outing time acquisition unit 813, and the provided information acquisition unit 815.

The home ID specification unit 811 specifies the RFID 70 installed in a predetermined area among the plurality of RFIDs 70 having the identification information thereof stored in the storage unit 82. In this embodiment, the predetermined area is set as being a user's house. The home ID specification unit 811 specifies the RFID 70 stored by the storage unit 82 as being in a category of "home", as being a home ID.

In a case where the identification information acquisition unit 810 has recognized, while having already recognized the RFID 70 specified as a home ID as described above, another RFID 70 different from the RFID 70, the outing ID provisional decision unit 812 stores the identification information of the other RFID 70 together with a time at which the identification information is recognized in an outing ID provisional storage table described later.

Specifically, the outing ID provisional decision unit 812 judges whether the identification information input from the identification information acquisition unit 810 includes the identification information of the RFID 70 specified as a home ID. When the information is included, the outing ID provisional decision unit 812 selects RFIDs 70 stored as being categorized as "wearable" or "portable" in the storage unit 82 from among the RFIDs 70 being currently recognized, and writes the RFIDs 70 together with a time (recognition time) at which each RFID 70 is recognized by the identification information acquisition unit 810 in the outing ID provisional storage table.

FIG. 15 shows an example of the outing ID provisional storage table. The outing ID provisional storage table is stored in the storage unit 82, and as shown in FIG. 15, the table stores identification information in correlation with the recognition time thereof. The outing ID provisional decision unit 812 stores the identification information of the RFIDs 70 selected as described above together with the recognition time thereof in the outing ID provisional storage table.

The outing time acquisition unit 813 monitors whether the aforementioned RFID 70 specified as a home ID is recognized by the identification information acquisition unit 810. When the outing time acquisition unit 813 recognizes at a certain point of time that the home ID that has been recognized by then has ceased to be recognized any more, the outing time acquisition unit 813 obtains the point of time and defines the time as outing time.

In the case where the outing time acquisition unit 813 has recognized that the aforementioned RFID 70 specified as a home ID is no longer recognized, the outing ID decision unit 814 decides the RFID 70 treated as an outing ID from among the RFIDs 70 identified by the identification information stored in the outing ID provisional storage table, based on the recognition time stored in the outing ID provisional storage table.

More specifically, the outing ID decision unit 814 decides to treat an RFID 70 as outing ID when the RFID 70 is identified by the identification information, among the identification information stored in the outing ID provisional storage table, which includes a difference between the aforementioned outing time and the recognition time thereof (hereinafter, referred to as differential time) having a value equal to or smaller than a predetermined outing judgment threshold value.

This outing judgment threshold value is stored for each home ID. FIG. 14 shows an example thereof. As shown in the figure, the storage unit 82 stores an outing judgment threshold value for each home ID. The outing ID decision unit 814 uses the outing judgment threshold value of the home ID that has been actually recognized (the home ID which has been recognized until most recently, of the RFIDs 30 stored as home ID in the storage unit 82), to thereby make the aforementioned decision.

Hereinbelow, a detailed description is given on a specific example with reference to FIGS. 14 and 15. When the outing time is 8:39:03, the differential time as to an ID-E is 8 minutes 38 seconds and the differential time as to an ID-F is 3 minutes 13 seconds. If an ID-A is the home ID that has been recognized immediately before the outing time, the outing judgment threshold value is 5 minutes.

The differential time as to the ID-E exceeds the outing judgment threshold value, so the outing ID decision unit 814 does not decide that the ID-E is an outing ID. On the other hand, the differential time as to the ID-F is below the outing judgment threshold value, so the outing ID decision unit 814 decides that the ID-F is an outing ID.

The outing ID decision unit 814 stores the outing ID thus decided in an outing ID storage table described below.

FIG. 16 shows an example of the outing ID storage table. The outing ID storage table is stored in the storage unit 82, and stores, as shown in FIG. 16, the identification information of each home ID, the identification information of each outing ID and the differential time in correlation with one another. The outing ID decision unit 814 stores the outing ID decided as described above together with the differential time related to the outing ID and a home ID corresponding to the outing judgment threshold value used for deciding the aforementioned outing ID in the outing ID storage table.

In a case where the identification information acquisition unit 810 has recognized an RFID 70 that is stored as an outing ID in the outing ID storage table, the provided information acquisition unit 815 generates a readout signal corresponding to the RFID 70 (for example, when a certain specific RFID 70 has been recognized, a readout signal for obtaining bus approach information is generated), and transmits the readout signal to the server device 90. Upon receiving the readout signal, the server device 90 transmits the provided information stored in correlation with the identification information of the RFID 70 to the RFID reader 80. In this manner, the provided information acquisition unit 815 obtains the provided information corresponding to the outing ID, and provides the provided information to a user through the I/O unit 83.

In the meantime, it is preferable that the control unit 81 updates the outing judgment threshold value based on how the outing ID has been decided by the outing ID decision unit 814. Specifically, it is preferable, in order to make it possible to more appropriately decide the outing ID, that the control unit 81 updates the aforementioned outing judgment threshold value based on the differential times with respect to respective RFIDs 70 calculated in the aforementioned outing ID decision process. Hereinbelow, a description will be given in this regard.

The control unit 81 updates the outing judgment threshold value for each home ID. The control unit 81 also updates the outing judgment threshold value which has been used for deciding the outing ID after the outing ID decision unit 814 has performed the aforementioned series of processes to decide an outing ID.

First, in a case where one or more of the outing IDs are stored in the outing ID storage table, the control unit 81 updates the outing judgment threshold value based on the smallest differential time of the differential times stored in relation to respective outing IDs. More specifically, the control unit 81 sets the outing judgment threshold value to be larger than the smallest differential time by a predetermined amount. Then, the control unit 81 compares the new outing judgment threshold value with each of the differential times of respective outing IDs, and deletes an outing ID that has a differential time exceeding the new outing judgment threshold value from the outing ID storage table. In this manner, the control unit 81 can decide the most appropriate one of the outing IDs.

Next, in a case where no outing ID has been stored in the outing ID storage table, the control unit 81 obtains the differential times each calculated based on the recognition time and the outing time of the respective RFIDs 70 stored in the outing ID provisional storage table in the aforementioned process. Then, the control unit 81 updates the outing judgment threshold value based on the smallest differential time of the differential times thus obtained. More specifically, the control unit 81 sets the smallest differential time to which a predetermined value is added, as the outing judgment threshold value. Note that the predetermined value is preferably set to be small enough that a time obtained by adding the predetermined value to the smallest differential time is not equal to or larger than any other one of the differential times. In this manner, even in a case where the outing judgment threshold value is so small that an outing ID cannot be decided, the control unit 81 can decide an outing ID appropriately.

The process of the RFID reader 80 described above will be described in more detail with reference to the processing flowchart.

Figure 17:
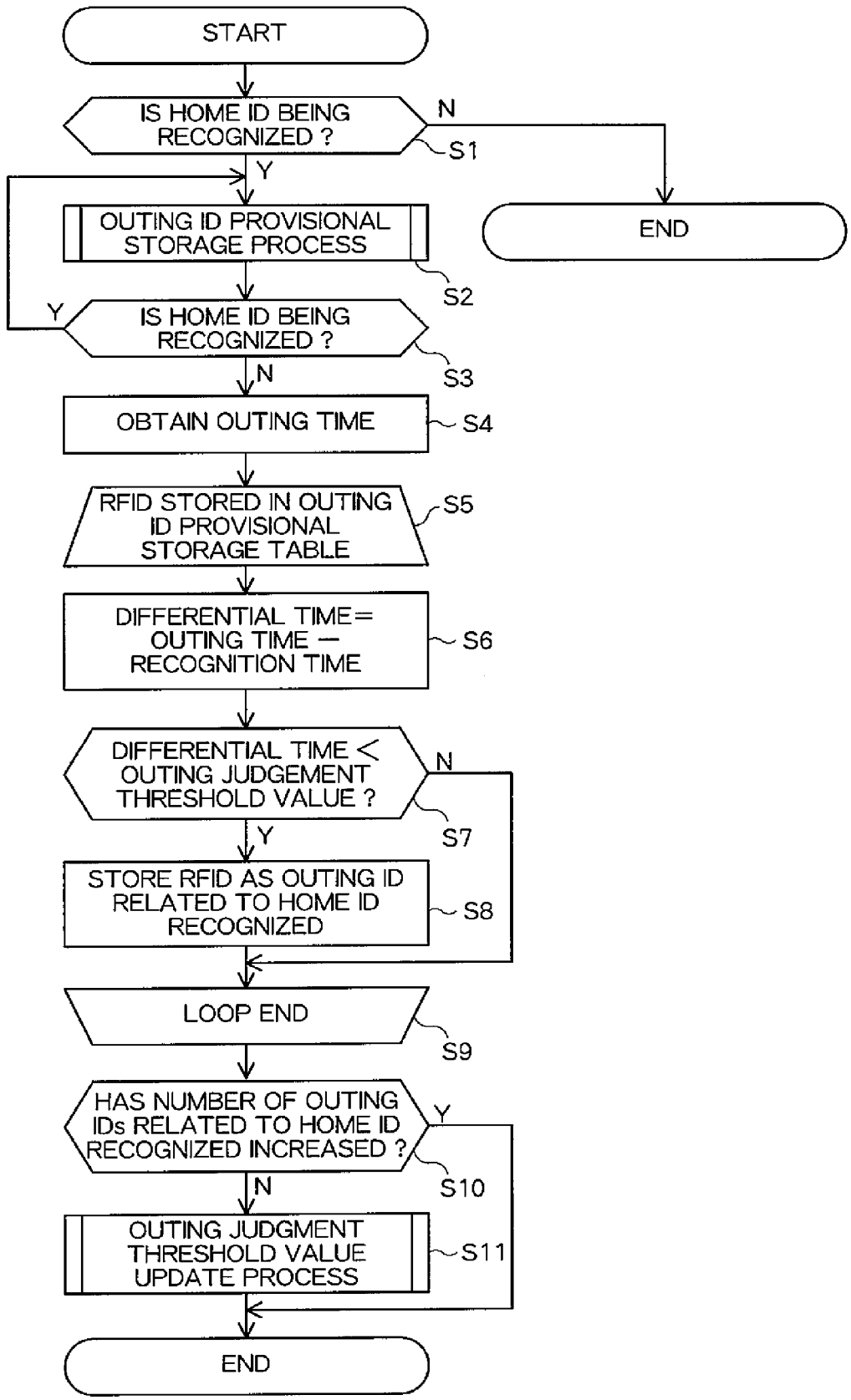
FIG. 17 is a diagram showing a processing flow of the outing ID decision process according to the second embodiment of the present invention.

FIG. 17 is a processing flowchart of the outing ID decision process performed by the RFID reader 80. First, the RFID reader 80 judges whether a home ID is being recognized or not (S1). If no home ID is being recognized, the RFID reader 81 ends the outing ID decision process. On the other hand, when a home ID is being recognized, the RFID reader 81 performs an outing ID provisional storage process (S2).

Figure 18:
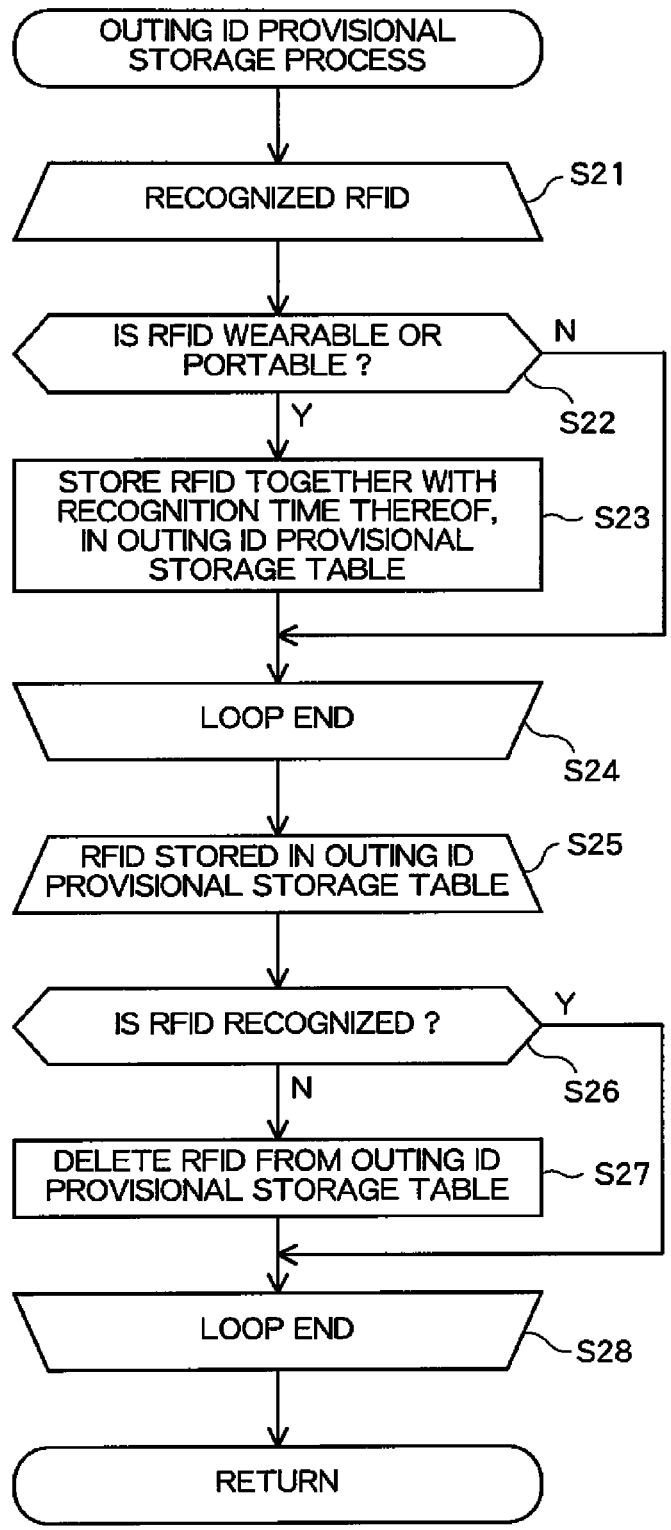
FIG. 18 is a diagram showing a processing flow of an outing ID provisional decision process according to the second embodiment of the present invention.

Next, the outing ID provisional storage process will be described. FIG. 18 is a processing flowchart of the outing ID provisional storage process. The RFID reader 80 judges, with respect to every one of the RFIDs 70 recognized (S21 and S24), whether the identification information thereof is stored as "wearable" or "portable" (S22), and stores the RFIDs 70 each having the identification information stored as "wearable" or "portable" together with the recognition times thereof in the outing ID provisional storage table (S23). At this time, it is preferable not to store an RFID 70 that has already been registered.

Then, the RFID reader 80 judges, as to every one of the RFIDs 70 stored in the outing ID provisional storage table (S25 and S28) whether the RFIDs 70 are actually being recognized (S26), and deletes an RFID 70 which is not being recognized from the outing ID provisional storage table (S27).

The outing ID provisional storage process is performed as described above.

The RFID reader 80 performs the outing ID provisional storage process while a home ID is being recognized, and the RFID reader 80 starts the process described below (S3) only after the home ID has ceased to be recognized any more. That is, the RFID reader 80 obtains the time at which the home ID ceases to be recognized any more as an outing time (S4).

Next, the RFID reader 80 performs the process described below with respect to every one of the RFIDs 70 stored in the outing ID provisional storage table (S5 and S9). Specifically, the difference between the outing time and the recognition time is calculated, and the difference is defined as differential time (S6). The RFID reader 80 judges whether or not the differential time is below the outing judgment threshold value (S7), and in a case where the differential time is judged to be below the outing judgment threshold value, the RFID reader 80 stores an RFID 70 having the differential time as an outing ID in correlation with home IDs which has already been recognized in the outing ID storage table (S8). In a case where the differential time exceeds the outing judgment threshold value, the process of S8 is skipped.

Upon completing the aforementioned process, the RFID reader 80 judges whether the number of outing ID related to the home ID recognized has been increased or not (S10), and in a case where the number has been increased, the RFID reader 80 ends the process. On the other hand, in a case where the number has not been increased, the outing judgment threshold value update process is performed (S11).

Figure 19:
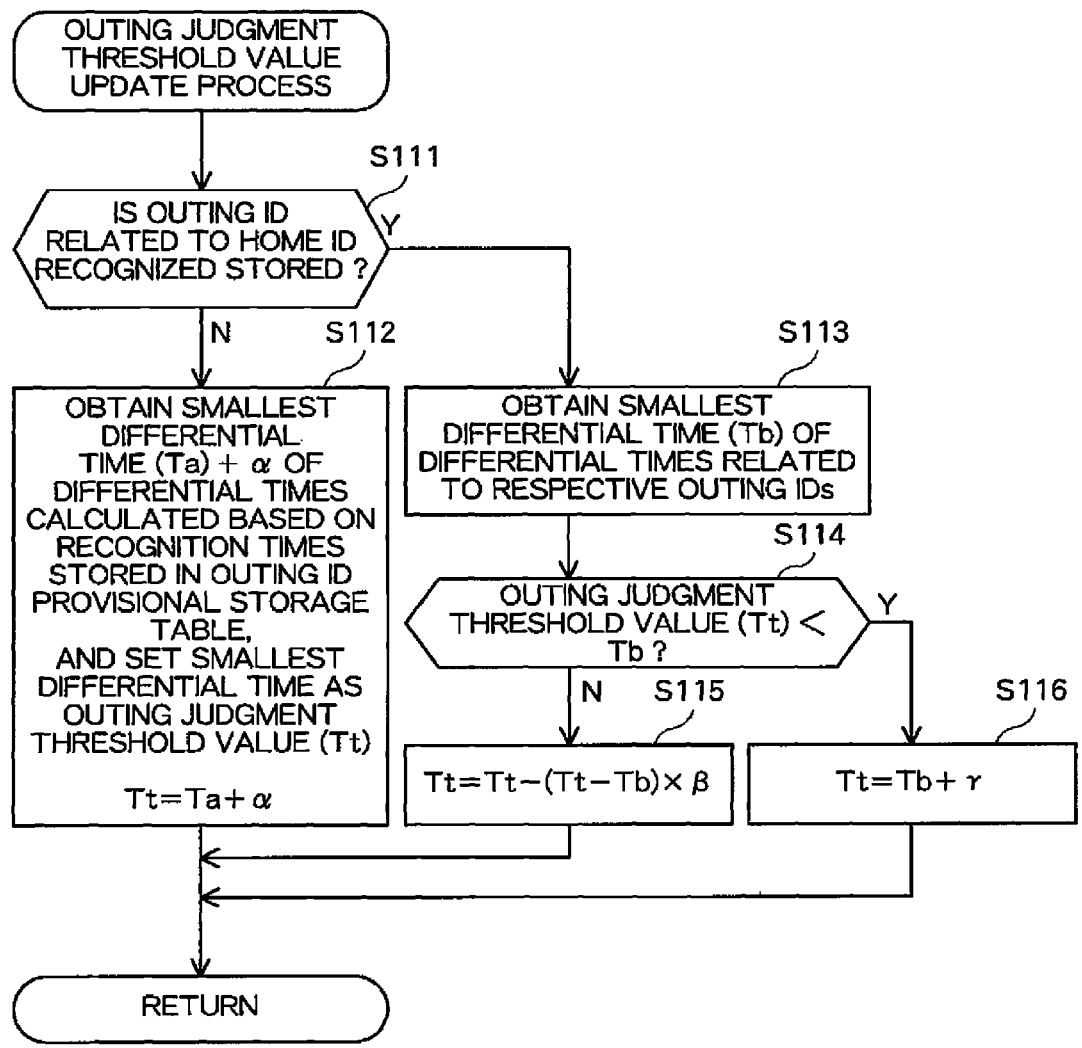
FIG. 19 is a diagram showing a processing flow of an outing judgement threshold value update process according to the second embodiment of the present invention.

FIG. 19 is a processing flowchart of the outing judgment threshold value (referred to as Tt) update process. First, the RFID reader 80 judges whether an outing ID is stored with respect to the home ID that has been recognized (S111). If the outing ID is not stored, the RFID reader 80 obtains the smallest differential time (referred to as Ta) of the differential times calculated in S6 with respect to respective RFIDs 70 stored in the outing ID provisional storage table, and performs calculation of $Tt=Ta+\alpha$, to thereby update the outing judgment threshold value (S112). The α has a predetermined value, which is, for example, small enough that the time obtained by adding α to the aforementioned Ta is not equal to or larger than any other one of the differential times.

In a case where an outing ID is stored, the RFID reader 80 obtains the smallest differential time (referred to as Tb) of the differential times stored in correlation with the respective outing IDs (S113). Then, if the Tb thus obtained is equal to or larger than the outing judgment threshold value Tt, the RFID reader 80 performs calculation of Tt=Tt−(Tt−Tb)×β, to thereby update the outing judgment threshold value (S115). In this manner, the RFID reader 80 sets the outing judgment threshold value to a value which is larger than Tb by (1−β)× (Tt−Tb). On the other hand, if Tb thus obtained is smaller than the outing judgment threshold value Tt, the RFID reader 80 performs calculation of Tt=Tb+γ, to thereby update the outing judgment threshold value (S116). In this case as well, the RFID reader 80 sets the outing judgment threshold value to a value larger than Tb by γ.

In the manner as described above, the RFID reader 80 can store an RFID 70 that has been recognized immediately before outing as an outing ID. Once the outing ID is stored, it becomes possible for the RFID reader 80 to recognize that a user is about to go out of a predetermined area such as a house through the intermediation of the outing ID. Further, it becomes possible to obtain the provided information (such as bus approach information and information on products on sale) to be needed by the user when the user is out, immediately before the user goes out.

Further, the RFID reader 80 can change the outing judgment threshold value for each home space, which makes it possible to decide an appropriate outing ID in view of individual situation of each home space such as a house or an office.

The invention claimed is:

1. A reader device for recognizing a data carrier capable of transmitting and receiving radio waves to and from the reader device from among a plurality of data carriers respectively installed in a plurality of objects, comprising:
    an acquisition unit configured to recognize one or more of the plurality of data carriers;
    a specifying unit that specifies a plurality of first data carriers installed in a predetermined area from among the plurality of data carriers;
    an outing ID provisional storage unit that stores, when a second data carrier is recognized by the acquisition unit while at least one of the first data carriers is being recognized by the acquisition unit, data carrier identification information for the second data carrier together with a recognition time, which is the time at which the second data carrier is recognized;
    an outing ID decision unit that identifies, when all of the first data carriers cease to be recognized and the second data carrier remains recognized, the second data carrier as a different type of carrier from the first data carriers, and stores outing data carrier identification information based on the recognition time of the second data carrier;
    a time acquisition unit that obtains an outing time at which all of the first data carriers cease to be recognized; and
    a storage unit that stores an outing judgment threshold value for each of the first data carriers, wherein
    the outing ID decision unit identifies the outing data carrier identification information based on whether a difference between the outing time and the recognition time is equal to or less than the outing judgment threshold value of a most recently recognized first data carrier, and
    the outing judgment threshold value is updated for each of the first data carriers.

2. An outing data carrier decision method for deciding a data carrier which is still recognized when a user has gone out of a predetermined area in which a reader device for recognizing a data carrier capable of transmitting and receiving radio waves to and from the reader device from among a plurality of data carriers respectively installed in a plurality of objects is used, comprising:
    specifying a plurality of first data carriers installed in the predetermined area from among the plurality of data carriers;
    storing, when a second data carrier is recognized while at least one of the first data carriers is being recognized, data carrier identification information of the second data carrier together with a recognition time, which is the time at which the second data carrier is recognized;
    determining, when all of the first data carriers cease to be recognized and the second data remains recognized, that the second data carrier is a different type of carrier from the first data carriers, and storing outing data carrier identification information based on the recognition time of the second data carrier;
    obtaining an outing time at which all of the first data carriers cease to be recognized;
    storing an outing judgment threshold value for each of the first data carriers;
    identifying the outing data carrier identification information based on whether a difference between the outing time and the recognition time is equal to or less than the outing judgment threshold value of a most recently recognized first data carrier; and
    updating the outing judgment threshold value for each of the first data carriers.

* * * * *